United States Patent
Jasmin et al.

(10) Patent No.: US 10,797,634 B1
(45) Date of Patent: *Oct. 6, 2020

(54) HEIGHT-ADJUSTABLE RAIL-LESS SOLAR PANEL MOUNTING DEVICE FOR ROOFS

(71) Applicant: Sunmodo Corporation, Vancouver, WA (US)

(72) Inventors: Roland Jasmin, Portland, OR (US); Jun Liu, Camas, WA (US)

(73) Assignee: Sunmodo Corporation, Vancouver, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/929,172

(22) Filed: Nov. 27, 2019

(51) Int. Cl.
*F24S 25/61* (2018.01)
*H02S 20/23* (2014.01)
*H02S 30/00* (2014.01)

(52) U.S. Cl.
CPC .............. *H02S 20/23* (2014.12); *H02S 30/00* (2013.01)

(58) Field of Classification Search
CPC ........ Y02E 10/47; Y02E 10/50; F24S 25/636; F24S 25/61; F24S 25/70
See application file for complete search history.

(56) References Cited

U.S. PATENT DOCUMENTS

| | | |
|---|---|---|
| 5,501,754 A | 3/1996 | Hiraguri |
| 7,435,134 B2 | 10/2008 | Lennox |
| 8,136,311 B2 | 3/2012 | Liu |
| 8,480,330 B2 | 7/2013 | Urban et al. |
| 8,683,761 B2 | 4/2014 | Danning |
| 8,943,765 B2 | 2/2015 | Danning et al. |
| 9,080,792 B2 | 7/2015 | Patton et al. |
| 9,175,878 B2 | 11/2015 | Kemmer et al. |
| 9,431,953 B2 | 8/2016 | Stearns et al. |
| 9,455,662 B2 | 9/2016 | Meine |
| 9,473,066 B2 | 10/2016 | Stephan et al. |
| 9,647,433 B2 | 5/2017 | Meine et al. |

(Continued)

FOREIGN PATENT DOCUMENTS

| | | |
|---|---|---|
| DE | 102005002828 A1 | 8/2006 |
| DE | 202006008867 U1 | 12/2007 |

(Continued)

OTHER PUBLICATIONS

Cut Sheet—Rock-it 2.0 Coupling, Sep. 2016, EcoFastener Solar, Morrisville, Vermont, U.S.

(Continued)

*Primary Examiner* — Brian E Glessner
*Assistant Examiner* — Daniel J Kenny
(74) *Attorney, Agent, or Firm* — Stone Creek Services LLC; Alan M Flum

(57) ABSTRACT

A solar panel mounting device can secure solar panels to roof structures. The solar panel mounting device allows for position adjustment lengthwise along a base via a threaded locking fastener. The base being mountable to a roof surface either directly or optionally via flashing. In addition, the height of a platform that can be used to seat one or more solar panels can be adjusted relative to the roof surface. The solar panel mounting device is so structured so that both the locking fastener and the height adjuster can be accessed from above the solar panels. This allows for both position and height adjustment after the solar panels are installed.

18 Claims, 22 Drawing Sheets

(56) References Cited

U.S. PATENT DOCUMENTS

| | | |
|---|---|---|
| 9,876,463 B2 | 1/2018 | Jasmin |
| 10,097,132 B2 | 10/2018 | Stearns et al. |
| 10,211,773 B2 | 2/2019 | Jasmin et al. |
| 10,340,837 B2 | 7/2019 | Wildes et al. |
| 10,461,682 B2 | 10/2019 | Schuit et al. |
| 10,476,425 B2 | 11/2019 | Stearns et al. |
| 2008/0244881 A1 | 10/2008 | Zante |
| 2011/0214365 A1 | 9/2011 | Aftanas |
| 2013/0048816 A1 | 2/2013 | Wentworth et al. |
| 2014/0174510 A1 | 6/2014 | Kanbara |
| 2015/0101997 A1 | 4/2015 | Liu et al. |
| 2015/0102194 A1 | 4/2015 | Liu |
| 2015/0129517 A1 | 5/2015 | Wildes |
| 2015/0288320 A1 | 10/2015 | Stearns et al. |
| 2016/0142006 A1 | 5/2016 | Meine et al. |
| 2016/0233820 A1 | 8/2016 | Redel |
| 2016/0248369 A1 | 8/2016 | Almy |
| 2016/0268958 A1 | 9/2016 | Wildes et al. |
| 2016/0308487 A1 | 10/2016 | Molina et al. |
| 2017/0025987 A1 | 1/2017 | Stearns et al. |
| 2017/0040931 A1 | 2/2017 | Schuit et al. |
| 2017/0063288 A1 | 3/2017 | Schuit et al. |
| 2017/0102167 A1 | 4/2017 | Stephan et al. |
| 2017/0104442 A1 | 4/2017 | McRostie et al. |
| 2018/0342974 A1 | 11/2018 | Jasmin et al. |
| 2019/0190437 A1* | 6/2019 | Kobayashi .............. H02S 30/10 |

FOREIGN PATENT DOCUMENTS

| | | |
|---|---|---|
| DE | 202011107843 U1 | 1/2012 |
| JP | 2004060358 A | 2/2004 |
| JP | 3175796 U3 | 5/2012 |
| WO | 201332470 A1 | 3/2013 |

OTHER PUBLICATIONS

Cut Sheet—Rock-it 2.0 Mount, Sep. 2016, EcoFastener Solar, Morrisville, Vermont, U.S.

Rock-it System 2.0 Rail Free Solar Mount, Mar. 2017, EcoFastener Solar, Morrisville, Vermont, U.S.

* cited by examiner

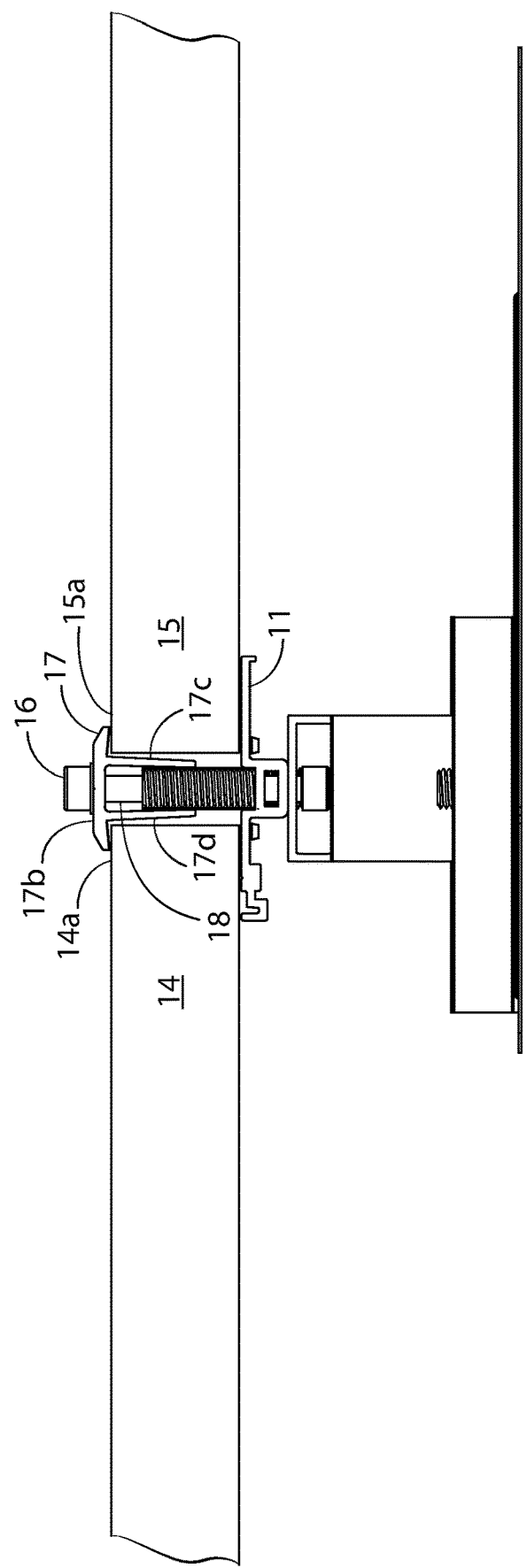

HEIGHT-ADJUSTABLE RAIL-LESS SOLAR PANEL MOUNTING DEVICE FOR ROOFS

BACKGROUND

This disclosure relates to a device for mounting solar panels to roofs of building structures.

Solar Panels can mount to various types of roof structures, such as pitched shingle roofs, tile roofs, metal roofs, or concrete roofs. Solar panels commonly secure to rails. Typically, these rails span the length of one or more solar panels. L-foot brackets and other mounting systems can secure the rails to the roof. The L-foot brackets often include slots to adjust the height of the rail with respect to the roof surface. Some rail-mounted solar panel mounting devices are slidable along the rail. This allows the installer to adjust the position of the solar panel along the roof line and position the solar panel with respect to other solar panels.

Solar panel installers and manufacturers seek to simplify installation and minimize system costs. One alternative to a rail-based system that attempts to do this is a rail-less solar panel mounting system. Rather than a rail that spans the length or width of one or more solar panels, a rail-less solar panel mounting system typically includes mounting devices spaced apart along the roof surface to support the solar panels. Rail-less solar panel mounting systems are potentially simpler than their rail-based counterparts. They do not require long spans of rail and do not require the installer to carry long spans of rail unto the roof. However, rail-less solar panel mounting systems are not without their challenges. With a rail-based system, the rails can be positioned and leveled before the heavy solar panels are mounted. For example, roof surfaces may not be level. Typically, in a rail-based system, the installer could adjust the angle of the rail by moving the rail connecting fastener up or down along the slot in the L-foot bracket in order to make the rail level. Once the rail is leveled, the solar panels can be mounted against the leveled rail. In rail-less system, there is no rail spanning the length of the solar panel. This creates a challenge to level the solar panels and adjust the position of the panel. To overcome this challenge, manufacturers have developed various strategies to adjust the position and height of the mounting hardware.

SUMMARY

The Inventors set out to develop a solar panel mounting assembly that could be used to mount solar panels to roofs without the need of rails. The Inventors' solar panel mounting assembly allows the height of the solar panels to be adjusted relative to the roof surface via a height adjuster. The height adjuster is oriented upwardly so the adjustment can be made from above. The solar panel can be adjusted along one direction, typically along a north-south roof line, by a slider assembly attached to a base. The base is secured to the roof surface. A threaded locking fastener can lock the slider assembly. Like the height adjuster, the threaded locking fastener is upwardly oriented so it can be adjusted from above. Because of the alignment and orientation of the height adjuster and the threaded locking fastener, an installer can adjust the solar panel height, angle, and position even while two or more panels are mounted to the solar panel mounting assembly. This can potentially simplify installation and reduce installation time.

In order to accomplish the benefits described above, the solar panel mounting assembly can include a base, a slider, a platform, a yoke, a height adjuster, and a threaded locking fastener. The base can be securable to the roof surface as discussed above. The slider is captively slidable with the base along the base's lengthwise axis. The platform is positioned above the slider. The platform can include a centerline of which solar panels can be mounted on the platform on each side of the centerline. The height adjuster and the threaded locking fastener can be positioned proximate to the centerline on opposite sides of the platform. The height adjuster can rotatably engage the platform, causing the platform and the solar panel to move relative to the slider, the base, and the roof surface. The yoke prevents the platform from rotating about the height adjuster. The threaded locking fastener can slidably engage the base through the slider and impinge against the base to control sliding of the slider relative to the base.

The solar panel mounting device can be structured to restrict movement of the platform that mounts the solar panel to only one-degree of freedom (i.e., only up and down movement). This can be accomplished by rigidly securing the yoke to the platform. The yoke is typically shaped like an inverted U. The yoke is positioned and shaped relative to the slider so that the yoke is restricted to only up or down movement along the slider.

This Summary introduces a selection of concepts in simplified form that are described the Description. The Summary is not intended to identify essential features or limit the scope of the claimed subject matter.

DRAWINGS

FIG. 5 illustrates a right and side elevation view of the solar panel mounting assembly of FIG. 1 showing a first solar panel and a second solar panel mounted on the platform.

DESCRIPTION

The terms "left," "right," "top," "bottom," "front," "rear," and "side," are relative terms used throughout this disclosure to help the reader understand the figures. Unless otherwise indicated, these do not denote absolute direction or orientation and do not imply a particular preference. When describing the figures, the terms "top," "bottom," "front," "rear," and "side," are oriented from the perspective of a person standing in front of the roof structure, where "front" would be in front of the roof, "top" would be above the roof, "left" would be to the left of the person facing the roof, and "right" would be to the right of the person facing the roof. The term "installer" is used to denote a person installing or servicing the solar panel structure and is simply used to denote a typical person performing the task described. It is not meant to limit description to any particular person or persons. Specific dimensions are intended to help the reader understand the scale and advantage of the disclosed material. Dimensions given are typical and the claimed invention is not limited to the recited dimensions. The use of ordinals such as first, second, or third are used as a naming convention. They do not denote that one feature, embodiment, or structure is superior or inferior to another.

Figure 1:
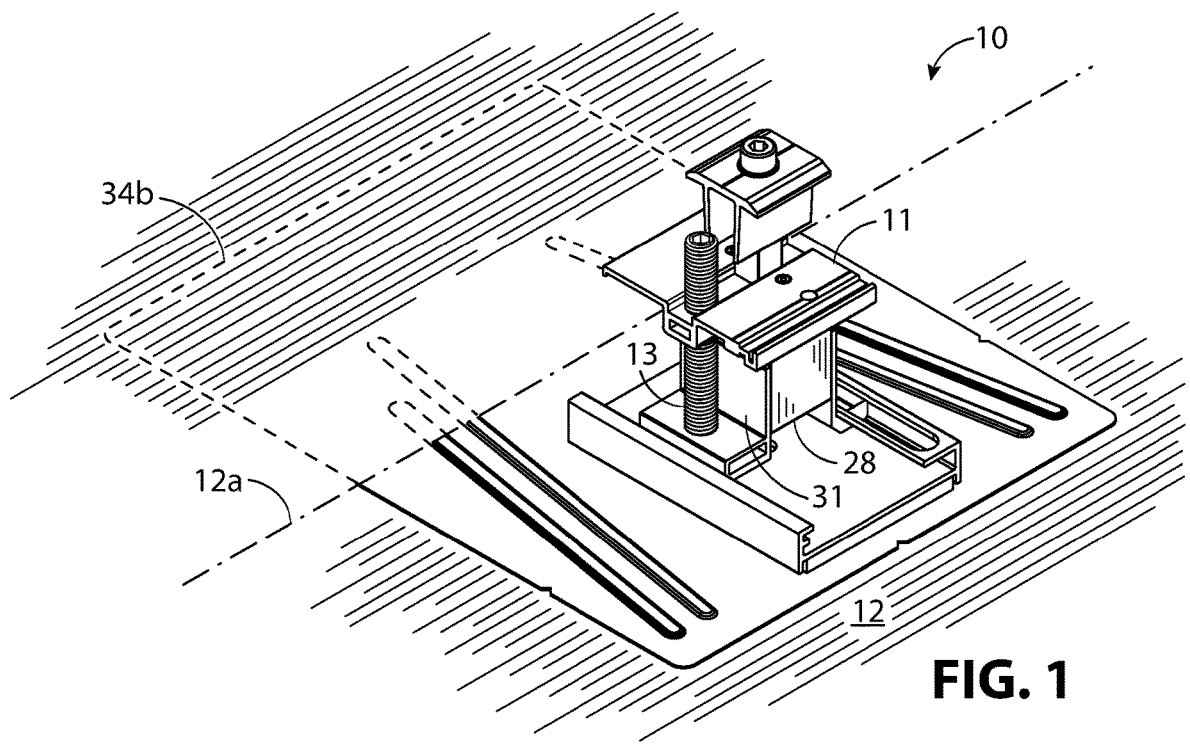
FIG. 1 illustrates a first example of the solar panel mounting assembly of the present disclosure in front, left, and top perspective view with the platform that supports the solar panels in a first position.
Figure 2:
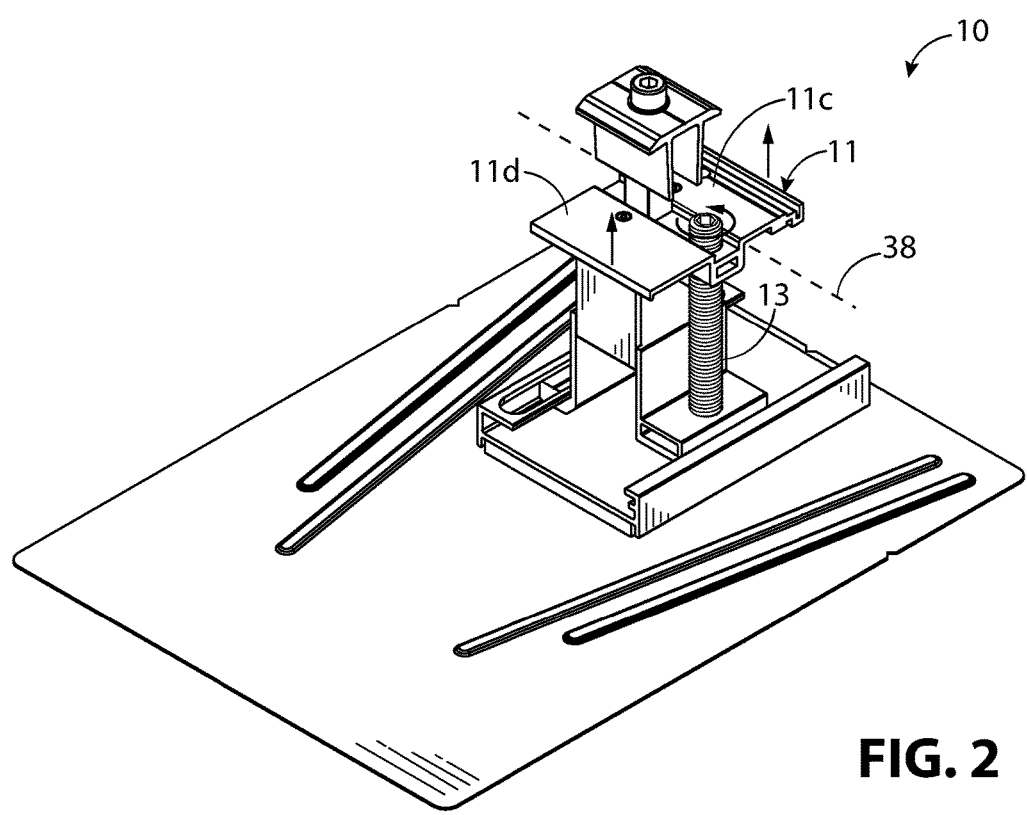
FIG. 2 illustrates the solar panel mounting assembly of FIG. 1 in rear, left, and top perspective view with the platform that supports the solar panels in a second position.
Figure 4:
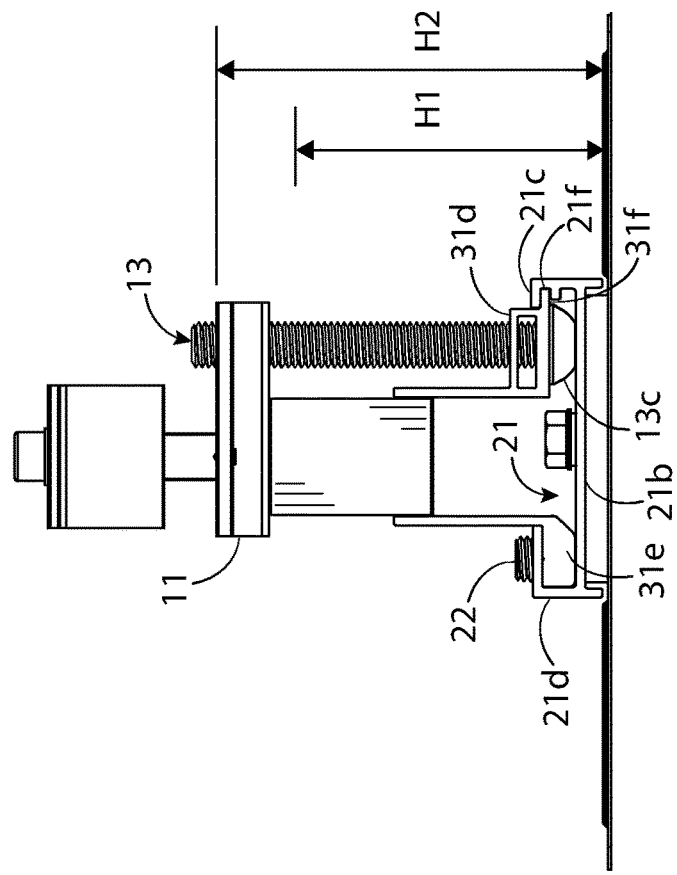
FIG. 4 illustrates the solar panel mounting assembly of FIG. 1 in rear view, with the platform that supports the solar panels positioned at a height H2 above the roof-mounting surface.
Figure 3:
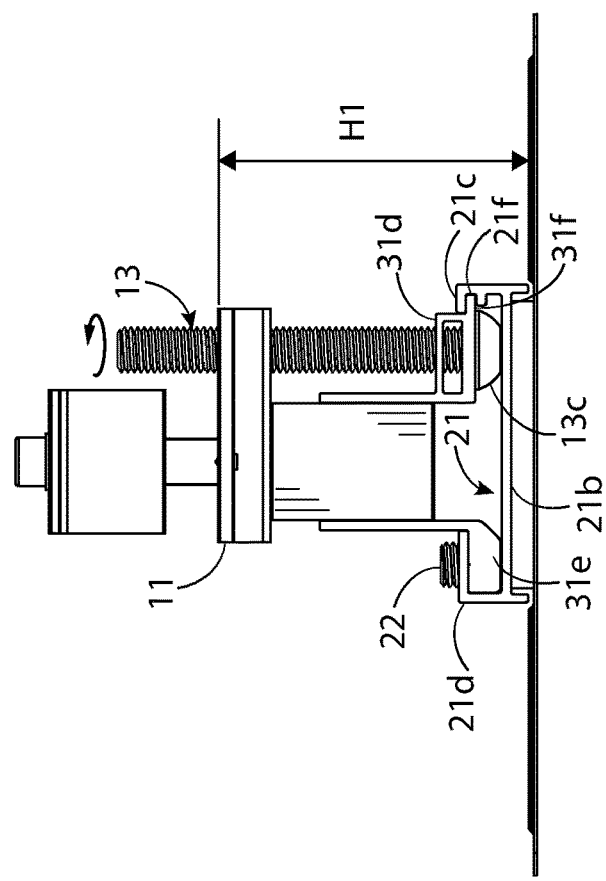
FIG. 3 illustrates the solar panel mounting assembly of FIG. 1 in rear view, with the platform that supports the solar panels positioned at a height H1 above the roof-mounting surface.

As discussed in the Summary, the Inventors set out to develop a solar panel mounting assembly that could be used to mount solar panels to roofs without the need of rails. Referring to the figures, where like numerals refer to like elements throughout the several views, FIGS. 1-32 illustrate several examples of the inventor's solar panel mounting assembly; solar panel mounting assemblies 10, 60, 80 of FIGS. 1, 20, and 31, respectively. The solar panel mounting assemblies 10, 60, 80 have several benefits. Referring to FIGS. 1 and 2, as a first benefit, the solar panel mounting assembly 10 allows the height of platform 11 to be adjusted relative to the roof surface 12 (FIG. 1) via a height adjuster 13. This is also illustrated in FIGS. 3 and 4 where the platform 11 moves from a height H1 in FIG. 3 to a height H2 in FIG. 4 as the height adjuster 13 rotatably engages the platform 11. The platform 11 can be adjusted from height H2 to height H1 by the height adjuster 13 rotatably engaging the platform 11 in the opposite direction of rotation. As illustrated in FIG. 5, the platform 11 is structured to seat up to two solar panels, a first solar panel 14 and a second solar panel 15. The first solar panel 14 and the second solar panel 15 are secured against the platform 11 by a threaded fastener 16 and solar panel clamp 17. Engaging the threaded fastener 16 into a pedestal 18 that projects from the platform 11 causes a solar panel clamp 17 to engage the top of the first solar panel frame 14a and the second solar panel frame 15a. This in turn clamps the first solar panel 14 and the second solar panel 15 to the platform 11.

Figure 6:
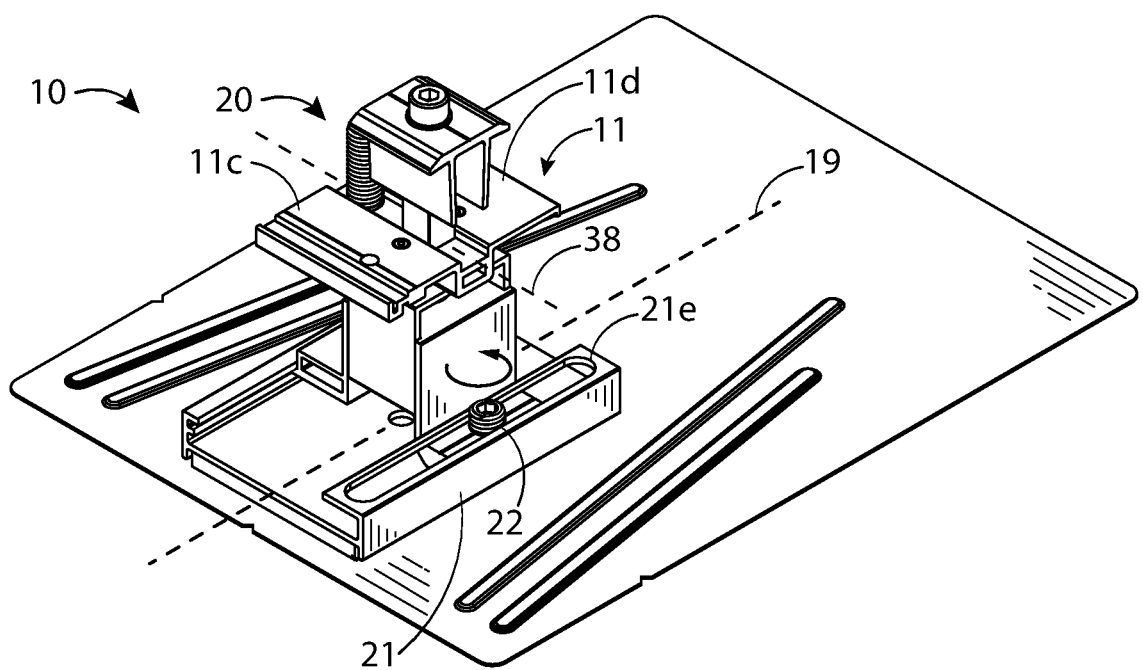
FIG. 6 illustrates the solar panel mounting assembly of FIG. 1 in front, right, and top perspective view with the upper assembly positioned approximately midway along the base.
Figure 7:
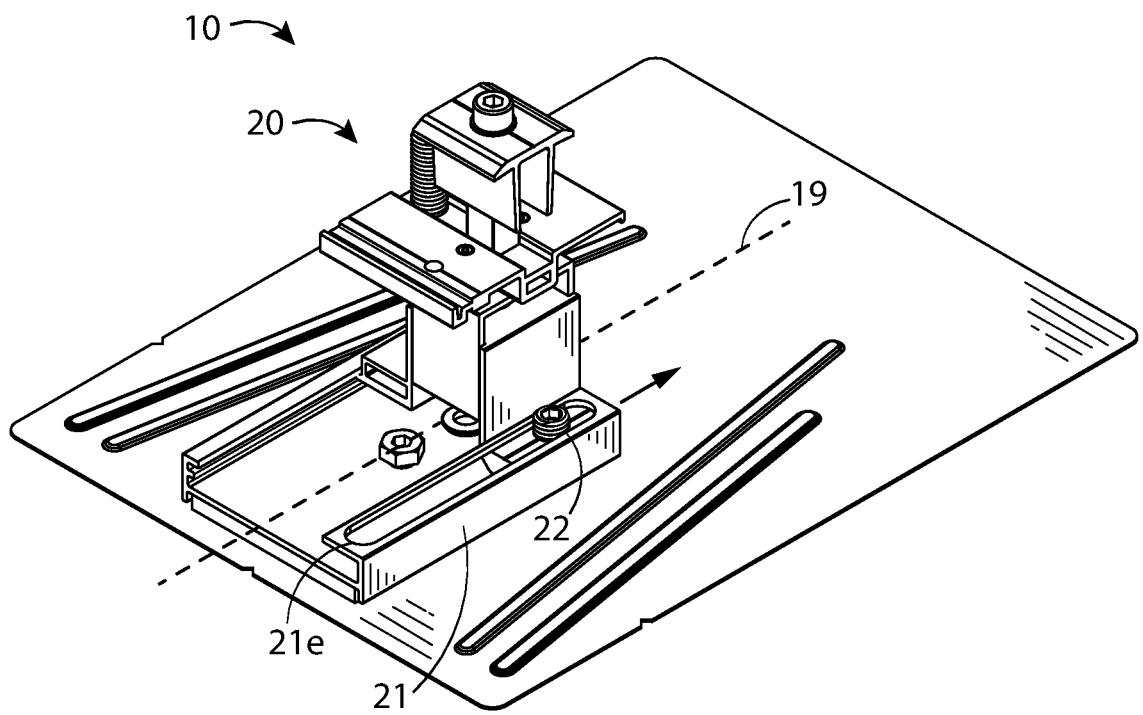
FIG. 7 illustrates the solar panel mounting assembly of FIG. 1 in front, right, and top perspective view with the upper assembly positioned nearly fully rearward along the base.

Referring to FIGS. 6 and 7, as a second benefit, a slider assembly 20 of the solar panel mounting assembly 10 can slide along a lengthwise axis 19 of the base 21. This is accomplished by loosening a threaded locking fastener 22 and sliding the slider assembly 20 along the lengthwise axis 19 of the base 21. Once the slider assembly 20 is moved to the desired position, the threaded locking fastener 22 can be tightened to secure the upper assembly 25 to the base 21.

Figure 8:
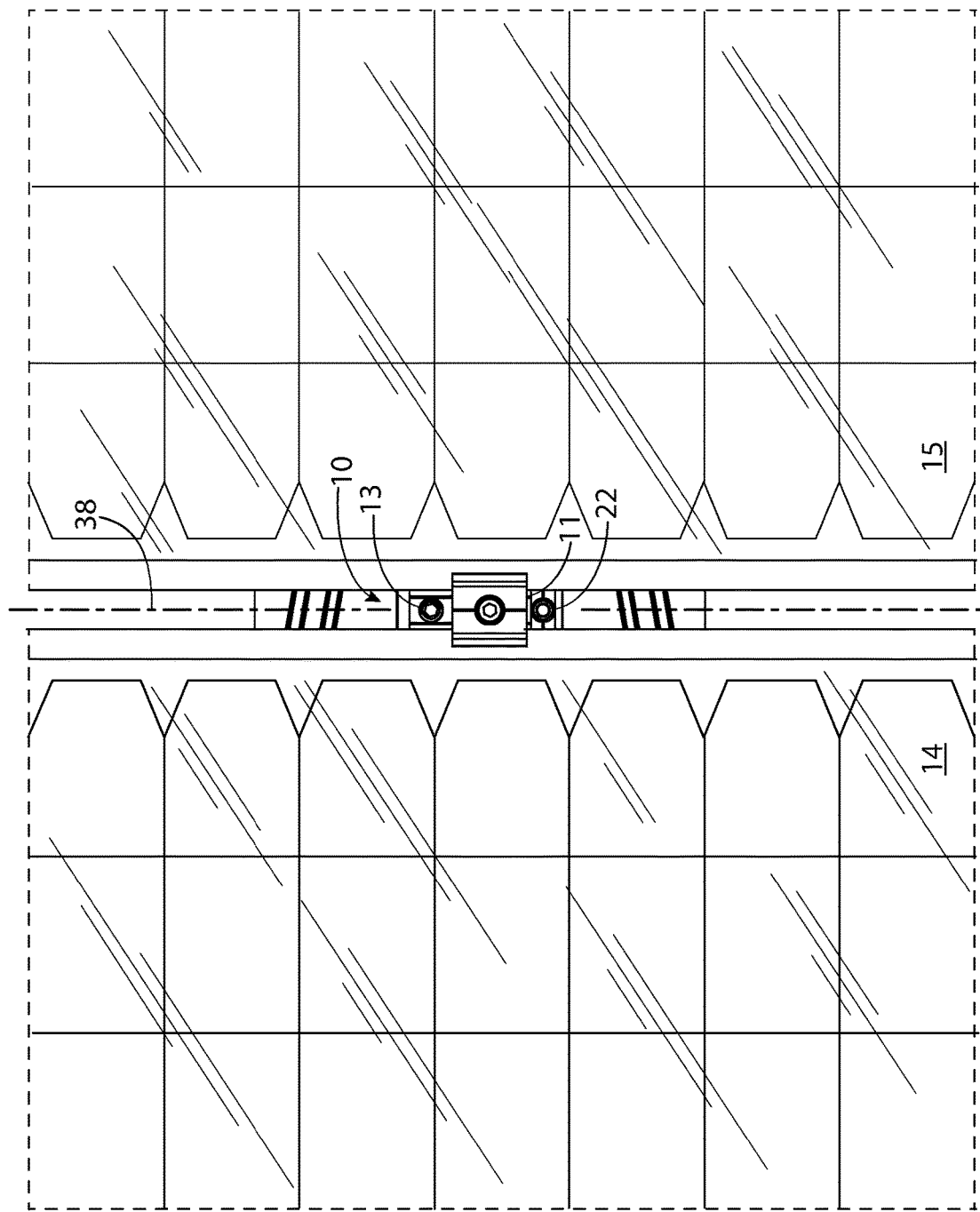
FIG. 8 illustrates top plan view of the assembly of FIG. 5 with solar panels mounted.

As illustrated in FIG. 8, as a third benefit, an installer can use a tool to adjust the height adjuster 13 and the threaded locking fastener 22 from above the first solar panel 14 and the second solar panel 15 after they are installed. This can potentially simplify assembly of the solar panel system and reduce installation time. The inventors accomplished this by placing a height adjuster 13 and a threaded locking fastener 22 on opposite sides the platform 11 proximate to the centerline 38 the divides the platform 11 lengthwise. Referring to FIGS. 2 and 6, the platform 11 includes a first sub-platform 11c for mounting a first solar panel, such as the first solar panel 14 of FIG. 8 and a second sub-platform 11d, for mounting a second solar panel, such as the second solar panel 15 of FIG. 8. The first sub-platform 11c and the second sub-platform 11d in combination with the solar panel clamp 17 define regions for mounting solar panels. The centerline 38 extends lengthwise between the first sub-platform 11c and the second sub-platform 11d.

As defined in this disclosure, the height adjuster being positioned proximate to the centerline means the height adjuster is positioned within a distance from the centerline such that a tool that is positioned above the solar panels can be engage the drive pattern in the height adjuster in the gap between the solar panels. As defined in this disclosure, the threaded locking fastener being positioned proximate to the centerline means the threaded locking fastener is positioned within a distance from the centerline such that a tool that is positioned above the solar panels can be engage the drive pattern in the threaded locking fastener in the gap between the solar panels.

As illustrated in FIGS. 3 and 4, as a fourth benefit, the height adjuster 13 and the threaded locking fastener 22 each project upward from opposite lengthwise flanges on the base 21. This increases stability of operation and helps to create the structure that allows the height adjuster 13 and the threaded locking fastener 22 to adjusted from above after the solar panels are mounted.

Figure 9:
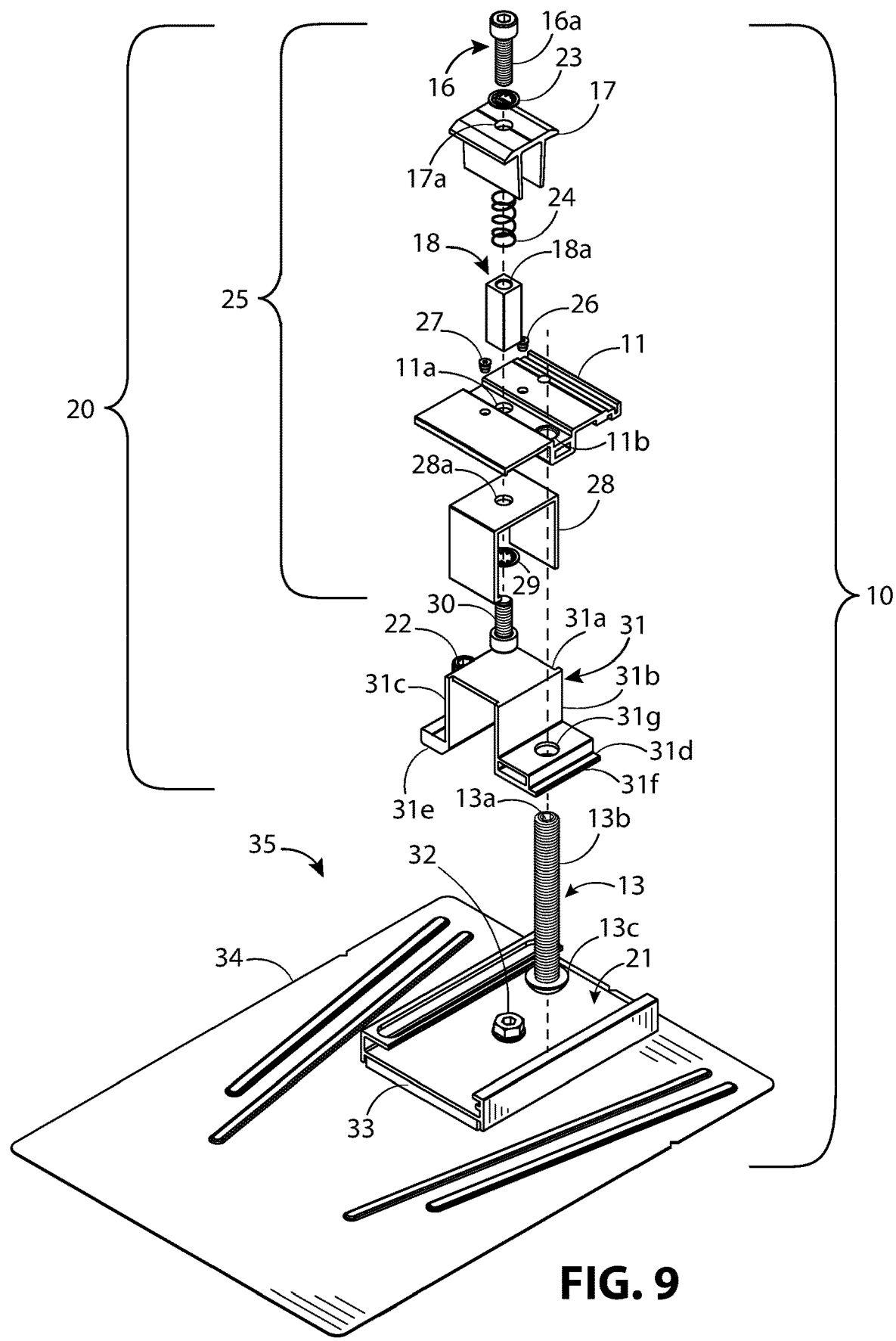
FIG. 9 illustrates a partially exploded, left, rear, and top perspective view of the solar panel mounting assembly of FIG. 1.
Figure 10:
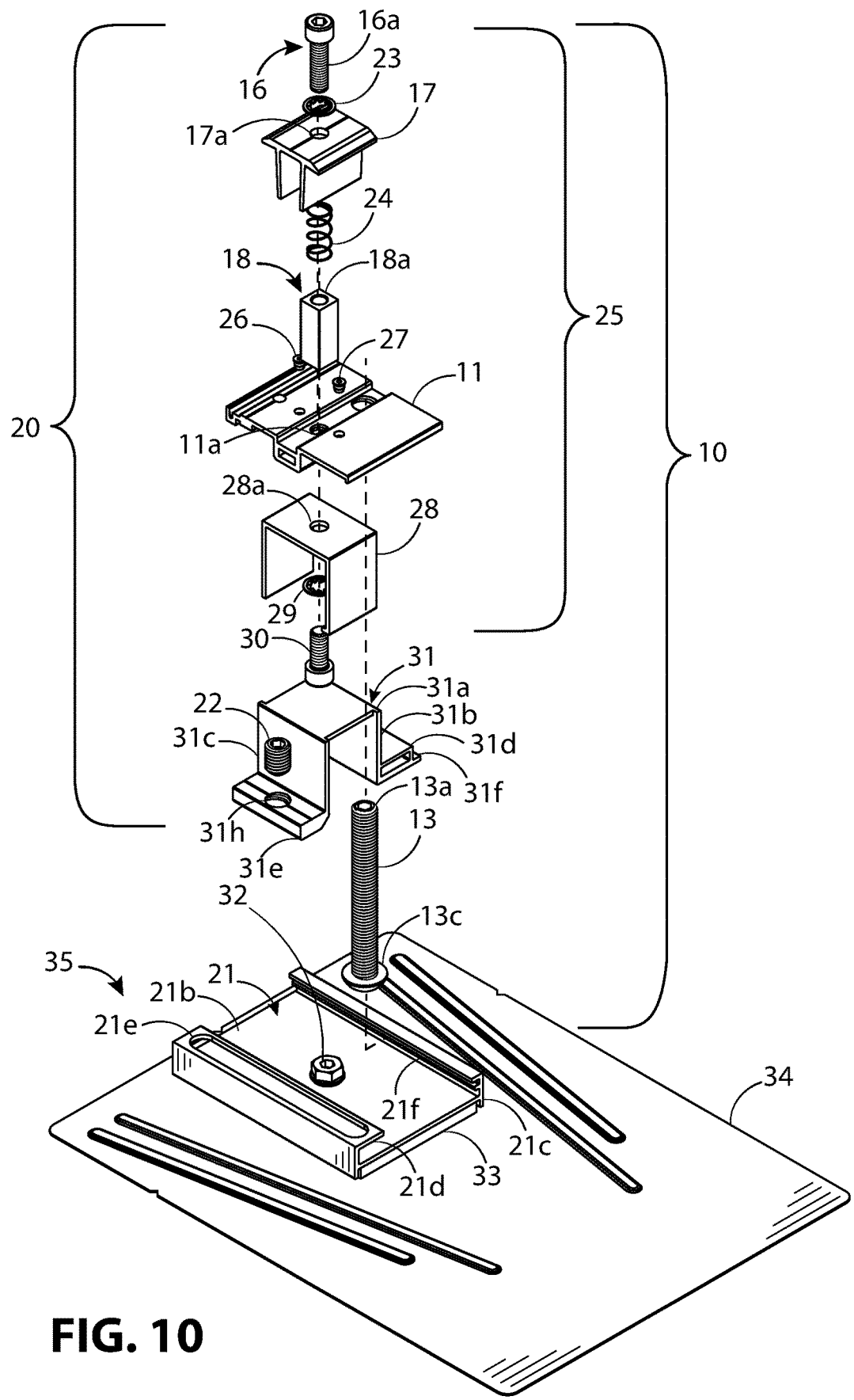
FIG. 10 illustrates an exploded, right, rear, and top perspective view of the solar panel mounting assembly of FIG. 1.

Referring to FIGS. 9 and 10, as illustrated from the top to the bottom of the partially exploded view, the solar panel mounting assembly 10 can include a threaded fastener 16, the solar panel clamp 17, a washer 23, a spring 24, the pedestal 18, grounding pins 26, 27, the platform 11, a yoke 28, a washer 29, a threaded fastener 30, a slider 31, the threaded locking fastener 22, the height adjuster 13, base 21, roof fastener 32, a gasket 33, and a flashing 34. The threaded fastener body 16a passes through the washer 23, an aperture 17a in the solar panel clamp 17, the spring 24 and into a threaded aperture 18a in the pedestal 18. The pedestal 18 and the yoke 28 are secured to the platform 11 by threaded fastener 30, a portion of which passes through washer 29, aperture 28a in the yoke 28, aperture 11a in the platform 11 and into a threaded aperture, hidden from view, in the bottom of the pedestal 18. Note that the threaded aperture that is hidden from view may be a blind hole or can be the threaded aperture 18a extending through the pedestal 18.

Referring to FIG. 5, the solar panel clamp 17 can include a clamp top wall 17b, a clamp first sidewall 17c, and a clamp second sidewall 17d projecting downward and inward from the clamp top wall 17b. The inward angling of the sidewalls allows the solar panel clamp 17 to act as either a mid clamp or an end clamp. Typically, mid clamps tend to cantilever as they are tightened. This effect is balanced by having one solar panel on each side of the clamp. However, mid clamps typically cannot be used as end clamps because there is not a second panel to balance the cantilever effect. The inwardly angling of the clamp first sidewall 17c and the clamp second sidewall 17d toward each other solve this problem. The inward angling helps to counterbalance any cantilevering.

Referring to FIGS. 9 and 10, the slider assembly 20, which includes the solar panel clamp 17, the pedestal 18, the platform 11, the yoke 28, and the slider 31 slidably engages the base 21. The threaded locking fastener 22 slidably engages the base 21 through the slider 31 and is impingeable against the base 21 to control sliding of the slider 31 relative to the base 21. The upper assembly 25, which includes the solar panel clamp 17, the pedestal 18, the platform 11, and the yoke 28, move up and down from the base 21 and slider 31 in response to engaging the drive pattern 13a and rotating the height adjuster 13. The yoke 28 is held in one-degree of freedom with respect to the slider 31, i.e., it is restricted to moving up and down along the slider 31 but cannot rotate. By holding the yoke 28 in one-degree of freedom in this way, it prevents the platform 11 and attached solar panels (not shown) from rotating as the yoke 28 moves up and down.

The slider 31 can be an inverted U-shape with flanges extending outward from the ends of the U-shape. As illustrated, the slider 31 includes a top wall 31a, a first sidewall 31b and a second sidewall 31c both extending down from the top wall 31a. As illustrated, the first sidewall 31b and the second sidewall 31c extend perpendicularly downward from the top wall 31a. While not essential, this simplifies the construction of the portion of the slider 31 that interacts with the yoke 28. The flange is formed by a first flange 31d and a second flange 31e that project outwardly away from opposing sides of the slider 31. For example, as illustrated the first flange 31d and the second flange 31e project outward from the first sidewall 31b and the second sidewall 31c, respectively, and form the sliding base for the slider 31. The first flange 31d can include a tab 31f that extends from its lengthwise outside edge. Referring to FIG. 9 the height-adjuster body 13b is received through a first aperture 31g through the top and bottom surface of the first flange 31d and threadably engages threaded aperture 11b through the top and bottom of the platform 11. Referring to FIG. 10, the threaded locking fastener 22 engages a threaded aperture 31h through the top and bottom of the second flange 31e.

Referring to FIG. 10, the base 21 includes a main body 21b, a first flanged lip 21c and a second flanged lip 21d that project upward from the base 21 and inward toward each other from opposing lengthwise sides of the base 21. The first flanged lip 21c can include a groove 21f disposed lengthwise along the base 21. The second flanged lip 21d includes an enclosed slot 21e disposed lengthwise along the base 21. Referring to FIGS. 3 and 4, the height-adjuster head 13c is held captive in between the bottom surface of the first flange 31d and the main body 21b of the base 21. The tab 31f slides lengthwise within the groove 21f of the first flanged lip 21c. The second flange 31e slides lengthwise within the second flanged lip 21d. The first flange 31d is offset upward compared with the second flange 31e in order to accommodate the height-adjuster head 13c. Referring to FIGS. 6, 7, and 10, the threaded locking fastener 22 extends through the enclosed slot 21e and into the threaded aperture 31h (FIG. 10 only) which is below the enclosed slot 21e. Referring to FIG. 9, the first aperture 37g of the first flange 31d is typically unthreaded in order to let the height-adjuster head 13c to turn freely. As the height-adjuster body 13b threadedly engages the threaded aperture 11b in the platform 11, the platform will move up or down depending on the type of threading (i.e., left-handed or right-headed) and the direction of rotation (i.e., clockwise or counterclockwise).

The height adjuster 13 is illustrated in FIGS. 3, 4, 9, and 10 as a button head machine screw. Referring to FIGS. 9 and 10, the drive pattern 13a is positioned at the end of the height-adjuster body 13b opposite the height-adjuster head 13c. While not required, the height-adjuster head 13c being round or elliptical has several advantages. Referring to FIGS. 3 and 4, the smooth radiused surface allows it to turn more freely while being captive between the first flanged lip 21c and main body 21b. Examples of round or elliptical head machine fasteners include round head, button head, truss head, pan head, oval head, or even a carriage bolt. These can be readily substituted without significant change in performance. Other threaded fasteners can be used that do not have a round or elliptical head, such as a hex head bolt or even a threaded rod held in place by one or more retaining clips.

Figure 11:
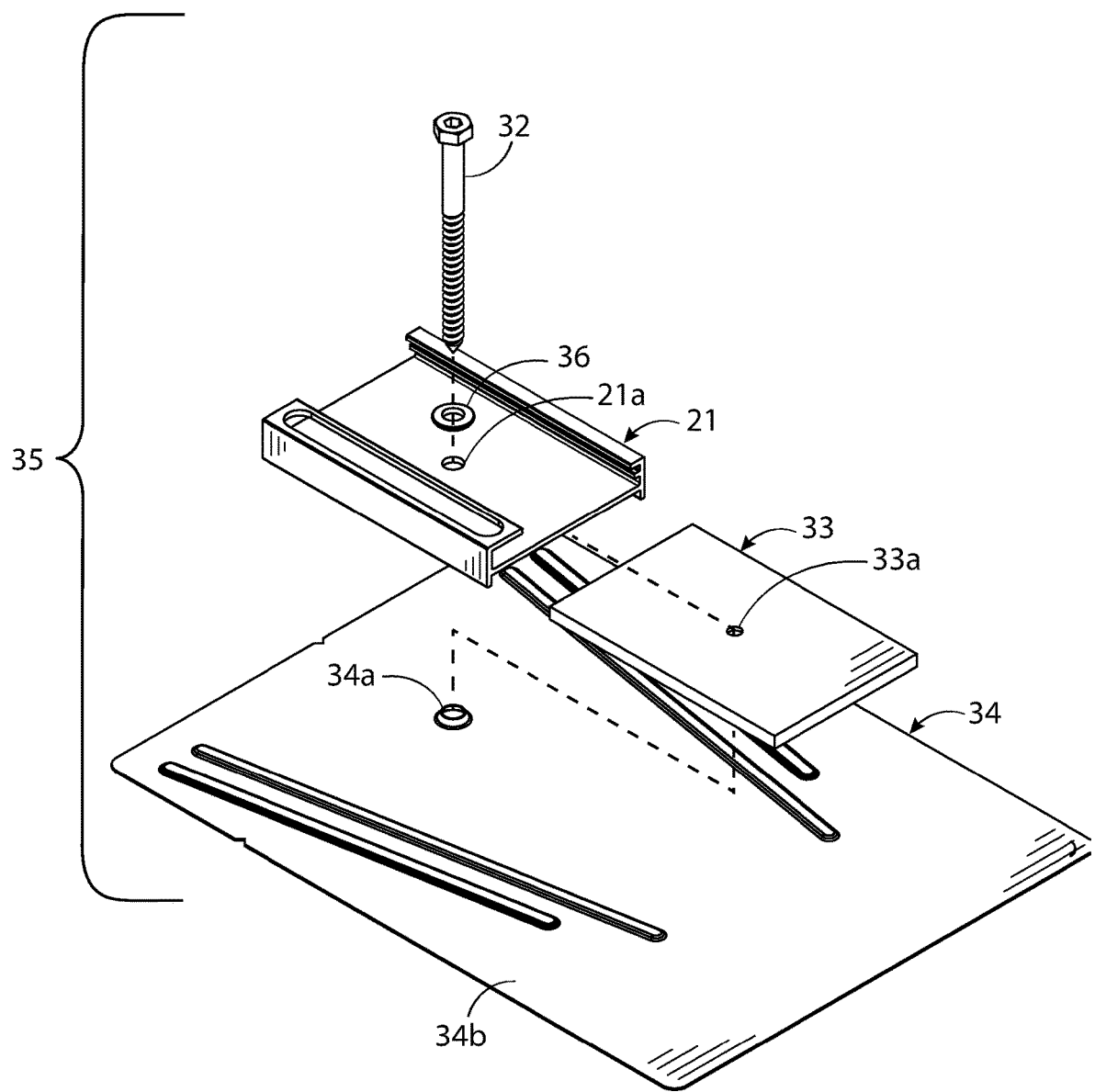
FIG. 11 illustrates an exploded, left, rear, and top perspective view of the base assembly of FIG. 1, which represents one of various roof-mounting options.

FIG. 11 illustrates an exploded view of the bottom assembly 35 of FIGS. 9 and 10. Referring to FIG. 11, as illustrated, the bottom assembly 35 can include the base 21, the roof fastener 32, the gasket 33, the flashing 34, and a water-repelling washer 36. The roof fastener 32 typically engages a roof rafter or truss joist via the water-repelling washer 36, an aperture 21a through the base 21, an aperture 33a through the gasket 33, and a gasket 34a in the flashing 34. The flashing rear portion 34b is typically tucked under the roof shingles in order to allow the system to shed water. This is illustrated in FIG. 1 where the flashing rear portion 34b is shown in dashed lines to represent that it is hidden below the shingles, and the shingle front edge 12a is represented by a dash-dot-dashed line.

Figure 12:
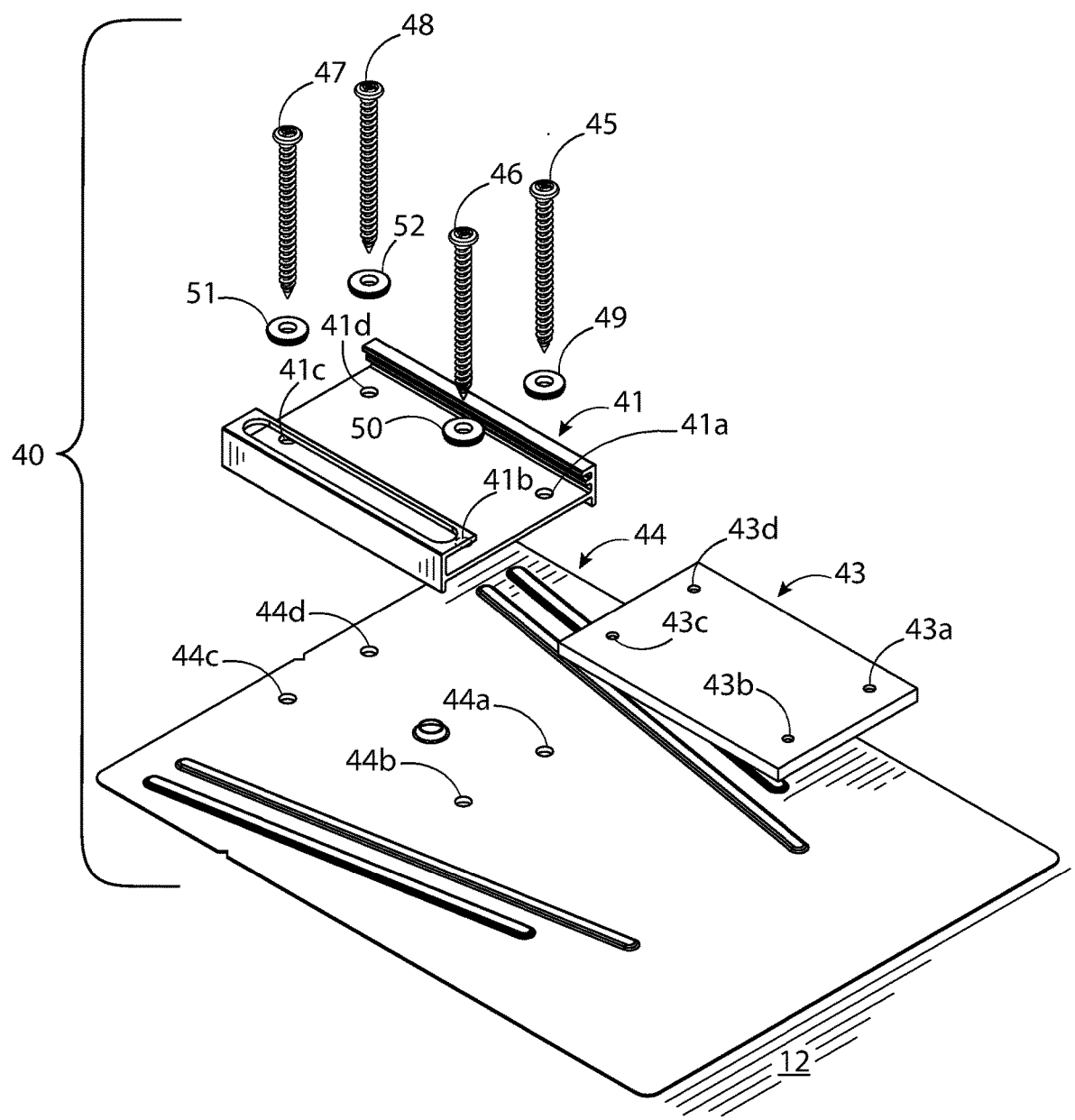
FIG. 12 illustrates an exploded, left, rear, and top perspective view of the alternative base assembly represent a second roof-mounting option.
Figure 13:
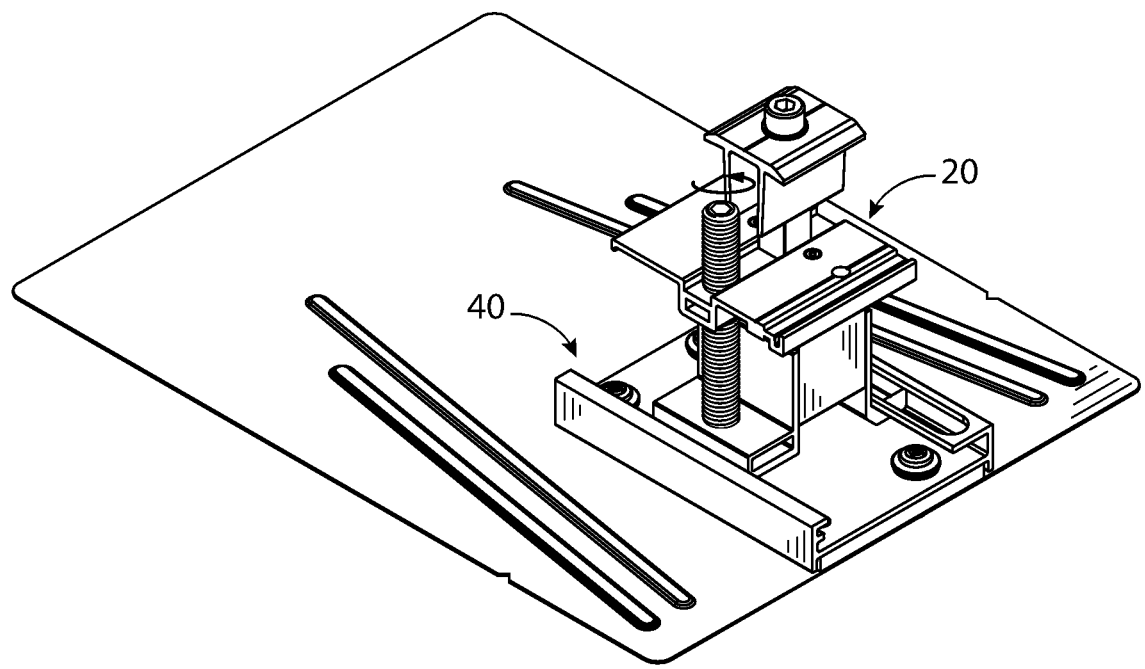
FIG. 13 illustrates the solar panel mounting assembly of FIG. 1 in front, left, and top perspective view with an alternative base assembly.
Figure 14:
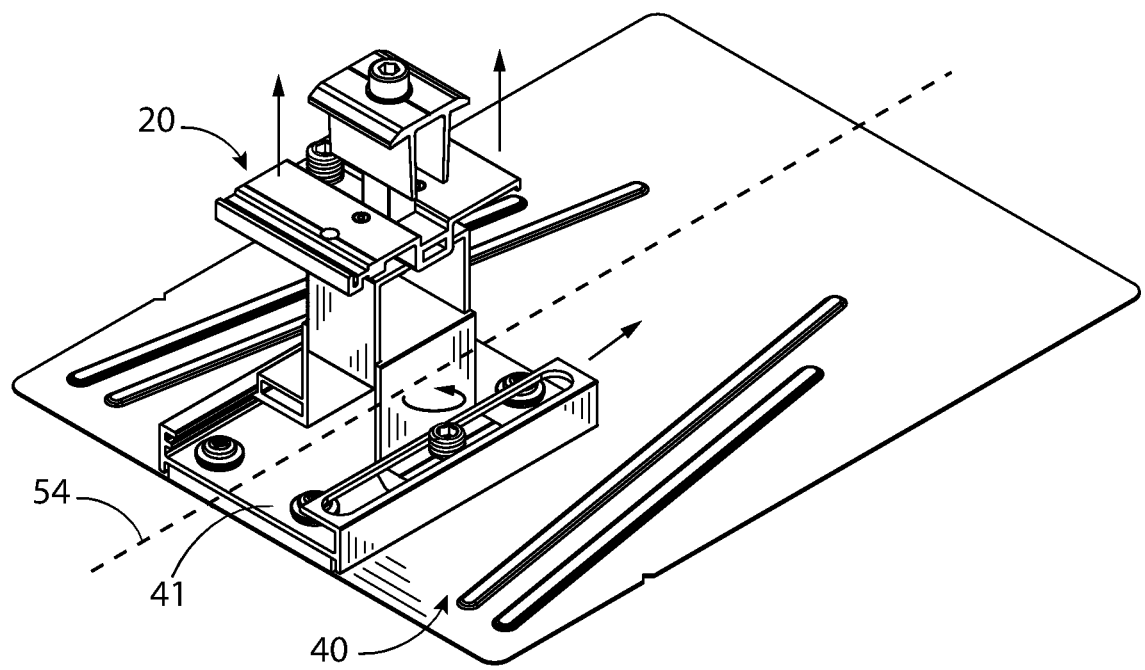
FIG. 14 illustrates the solar panel mounting assembly of FIG. 1 in front, right, and top perspective view with an alternative base assembly.

It is not always convenient or feasible for the installer to install the solar panel mounting assembly 10 directly to a rafter or truss joist. FIG. 12 illustrates an alternative version of a bottom assembly 40 that allows the installer to secure the solar panel mounting assembly 10 to a roof deck without engaging the rafters or truss joists. FIGS. 13 and 14 illustrate the bottom assembly 40 of FIG. 12 with the slider assembly 20 as previously described. Referring to FIG. 12, the bottom assembly 40 includes base 41, gasket 43, flashing 44, roof deck fasteners 45, 46, 47, 48, and water-repelling washers 49, 50, 51, 52. The roof deck fasteners 45, 46, 47, 48 can engage a roof deck under the roof surface 12 via water-repelling washers 49, 50, 51, 52, base apertures 41a, 41b, 41c, 41d, gasket apertures 43a, 43b, 43c, 43d, and flashing apertures 44a, 44b, 44c, 44d, respectively. Note that while four roof decking fasteners and associated water-repealing washers are illustrated, depending on the wind requirements and roof decking material and thickness fewer or more roof decking screws can be used. Except for the base apertures 41a, 41b, 41c, 41d, the base 41 is structurally equivalent to the base 21. Therefore, the combination of the bottom assembly 40 and slider assembly 20 structurally cooperate with each other in the same manner as described for the slider assembly 20 and the bottom assembly 35 of FIG. 11. For example, in FIG. 13 the height adjuster 13 can be turned in order to raise the platform 11 as shown in FIG. 14, or lower the platform back to the position in FIG. 13. As shown in FIG. 14, the threaded locking fastener 22 can be loosened to slide the slider assembly 20 relative to the base 41 along the lengthwise axis 54 of the base 41.

Figure 15:
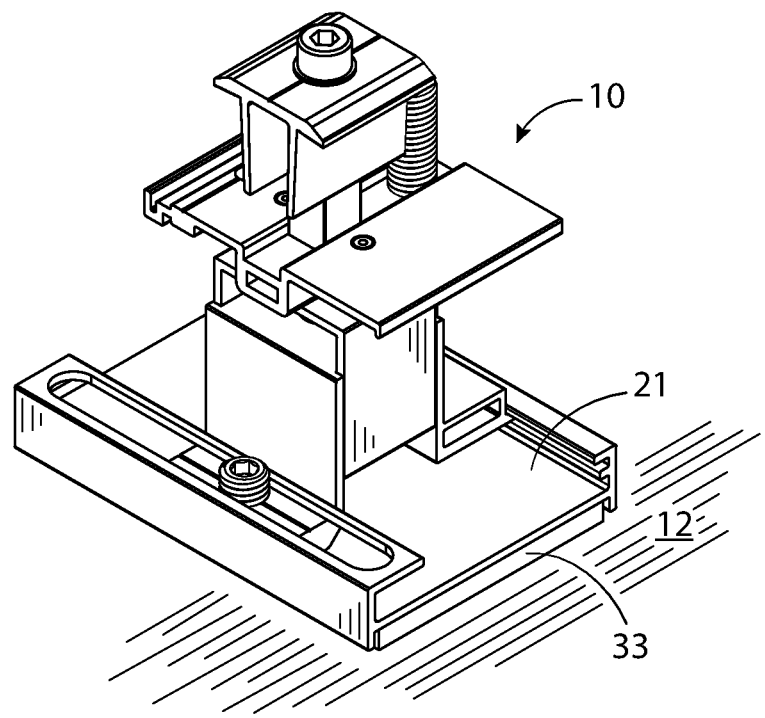
FIG. 15 illustrates a rear, right, and top perspective view of the solar panel mounting assembly of FIG. 1 mounted to a roof without the optional flashing.
Figure 16:
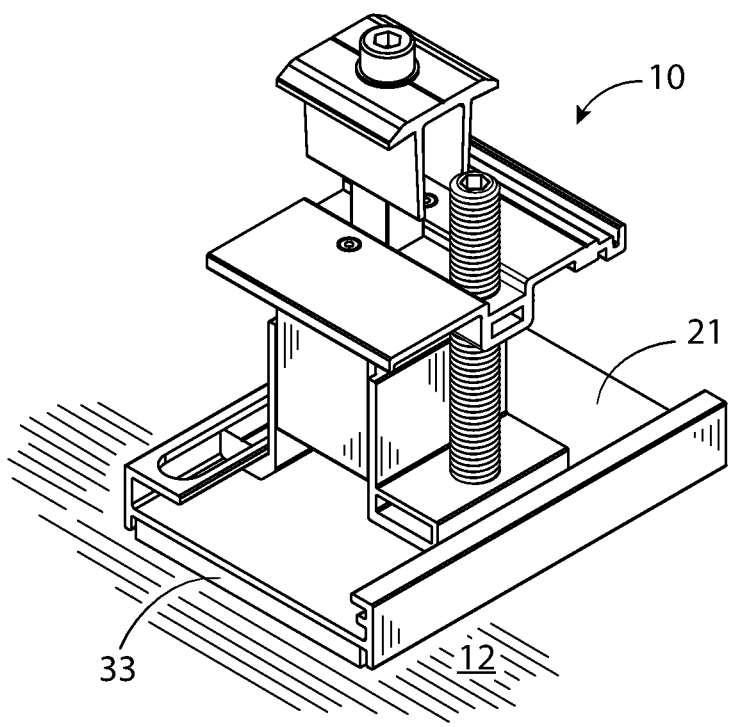
FIG. 16 illustrates a rear, left, and top perspective view of the solar panel mounting assembly of FIG. 15 mounted to a roof without the optional flashing.

While often desirable to use flashing, it may be desirable not to use flashing. FIGS. 15 and 16 illustrate the solar panel mounting assembly 10 mounted directly to the roof surface 12 without flashing. The gasket 33, which extends below the bottom surface of the base 21, makes direct contact with the roof surface 12. The gasket 33 can be made of a material such as ethylene propylene diene monomer rubber (EPDM) or other elastomers. The inventors discovered that by using EPDM foam rather than ordinary EPDM, and extending it below the bottom surface of the base 21, as the roof fastener 32 is tightened (hidden from view in FIGS. 15 and 16), the gasket 33 will compress and creates a water-tight seal. The large surface area of the base 21 provides some additional water shedding. While EPDM is used in solar panel mounting structures, the inventors believes that he is the first to use EPDM foam, rather than ordinary EPDM and extending below the bottom of the roof-mounting surface of the solar panel mounting assembly. An additional benefit of using EPDM foam is that the spring forces in the EPDM foam, which are greater than ordinary EPDM or other rubbers, allow the foam to expand and contract and keep the solar panel mounting assembly 10 from creeping or moving with changes in temperature.

Figure 17:
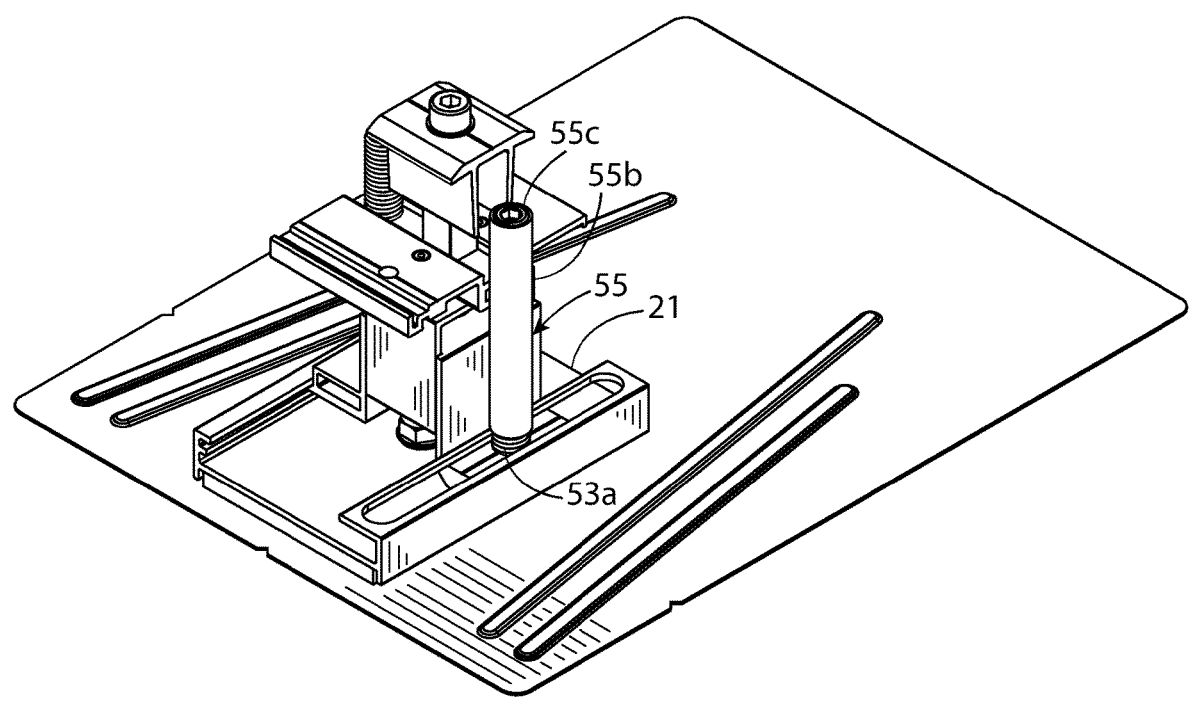
FIG. 17 illustrates the solar panel mounting assembly of FIG. 1 in front, right, and top perspective view with an extended version of the locking fastener.

The threaded locking fastener 22 of FIGS. 6 and 7 is illustrated as a set screw that extends perpendicularly upward from the base 21. It may be desirable to extend the length of the threaded locking fastener 22 for easier adjustment once the solar panels are in position, such as in FIG. 8. FIG. 17 shows a threaded locking fastener 55 that extends perpendicularly upward from the base 21. The threaded locking fastener 55 includes a threaded portion 55a at the bottom end, a body 55b, and a drive pattern 55c at the top end. The drive pattern, or tool-receiving pattern, illustrated as a hexagonal inset sized and shaped to receive a hexagonal wrench (or Allen wrench). Drive patterns other than hexagonal insets can be use. For example, the drive pattern can be a slot head, Phillips, or torx. In addition, instead of being inset, the drive pattern may be shaped into the perimeter of the body end; for example, a hexagonal perimeter in order to receive a six-point socket.

Figure 18:
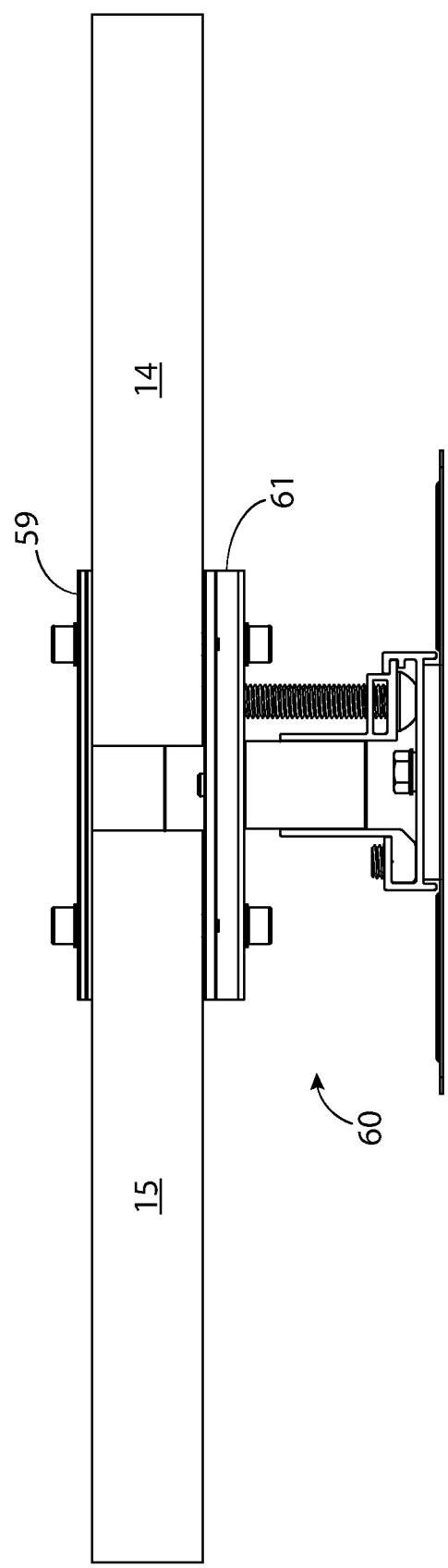
FIG. 18 illustrates a rear elevation view of a second example of the solar panel mounting assembly showing portions of a first solar panel and a second solar panel mounted on the platform.
Figure 19:
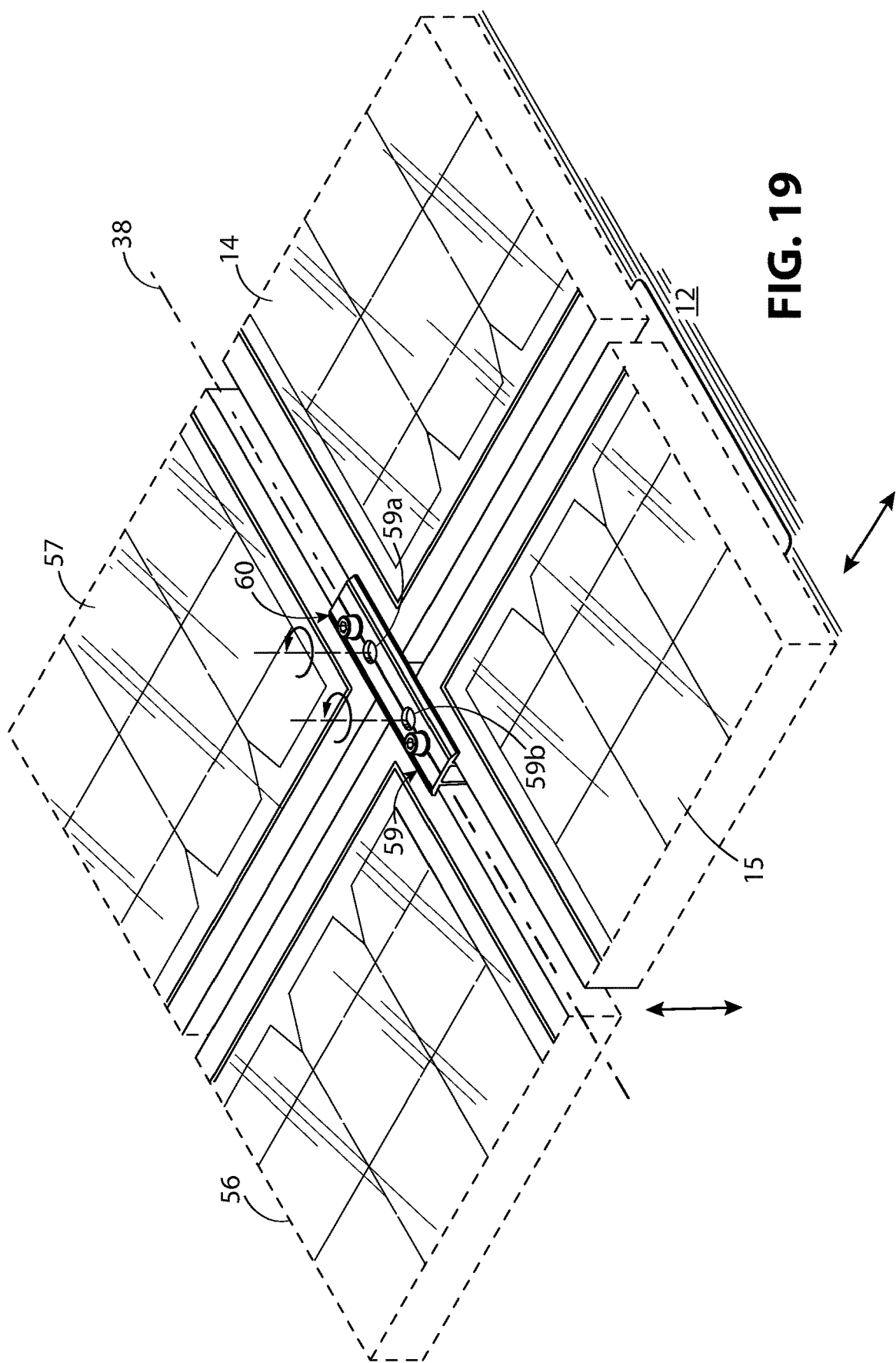
FIG. 19 illustrates a right, rear, and top perspective view of the solar panel mounting assembly of FIG. 18 showing portions of four solar panels mounted on the platform.

Referring to FIGS. 18 and 19, using the principles of operation described for the solar panel mounting assembly 10 of FIG. 1, the inventors developed a solar panel mounting assembly 60 that could secure one to four solar panels. FIG. 19 illustrates a first solar panel 14, a second solar panel 15, a third solar panel 56, and a fourth solar panel 57 secured to the solar panel mounting assembly 60. FIG. 18 illustrates in rear view, the solar panel mounting assembly 60 showing two of these solar panels, the first solar panel 14 and the second solar panel 15, mounted between a solar panel clamp 59 and a platform 61. The solar panel mounting assembly 60 includes the benefits discussed for the solar panel mounting assembly 10 of FIG. 1. Referring to FIG. 19 solar panel mounting assembly 60 is height and lengthwise adjustable. These adjustments can be performed with the solar panels secured to the solar panel mounting assembly 60. In FIG. 19, first solar panel 14, second solar panel 15, third solar panel 56, and fourth solar panel 57 can be raised and lowered and moved back and forth with respect to the roof surface 12. The adjustments can be performed through the top of the solar panel clamp 59. FIG. 19 illustrates a first aperture 59a and a second aperture 59b through which a tool can be inserted to adjust the height and lock/unlock the sliding mechanism.

Figure 20:
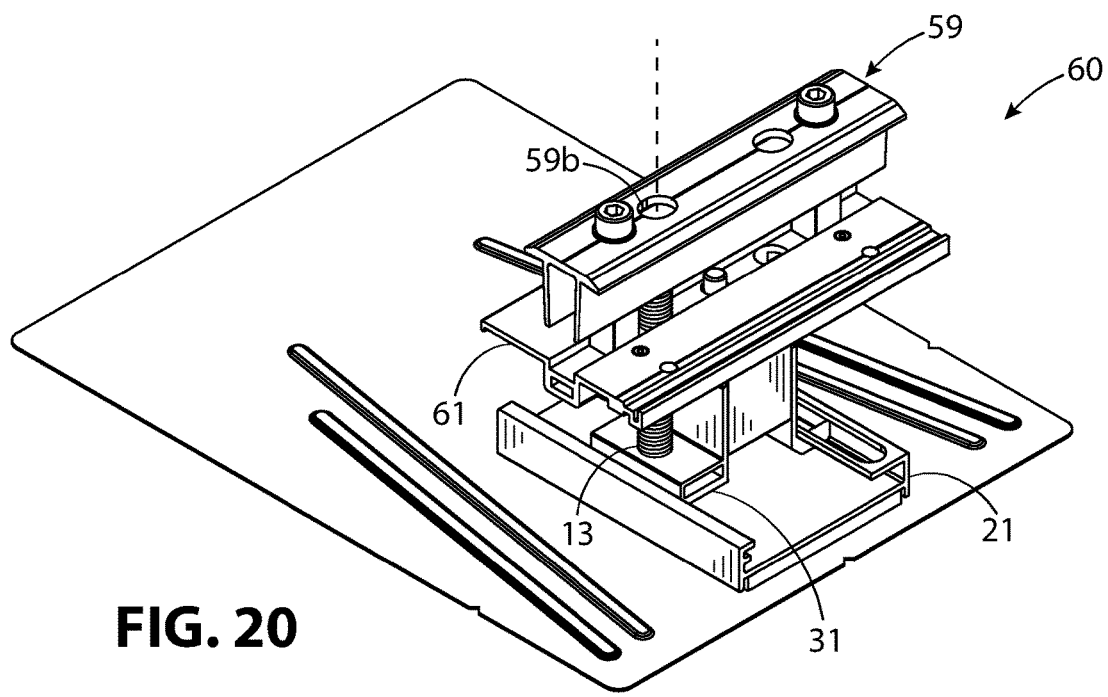
FIG. 20 illustrates the second example of the solar panel mounting assembly in front, left, and top perspective view with the platform that supports the solar panels in a first position.
Figure 21:
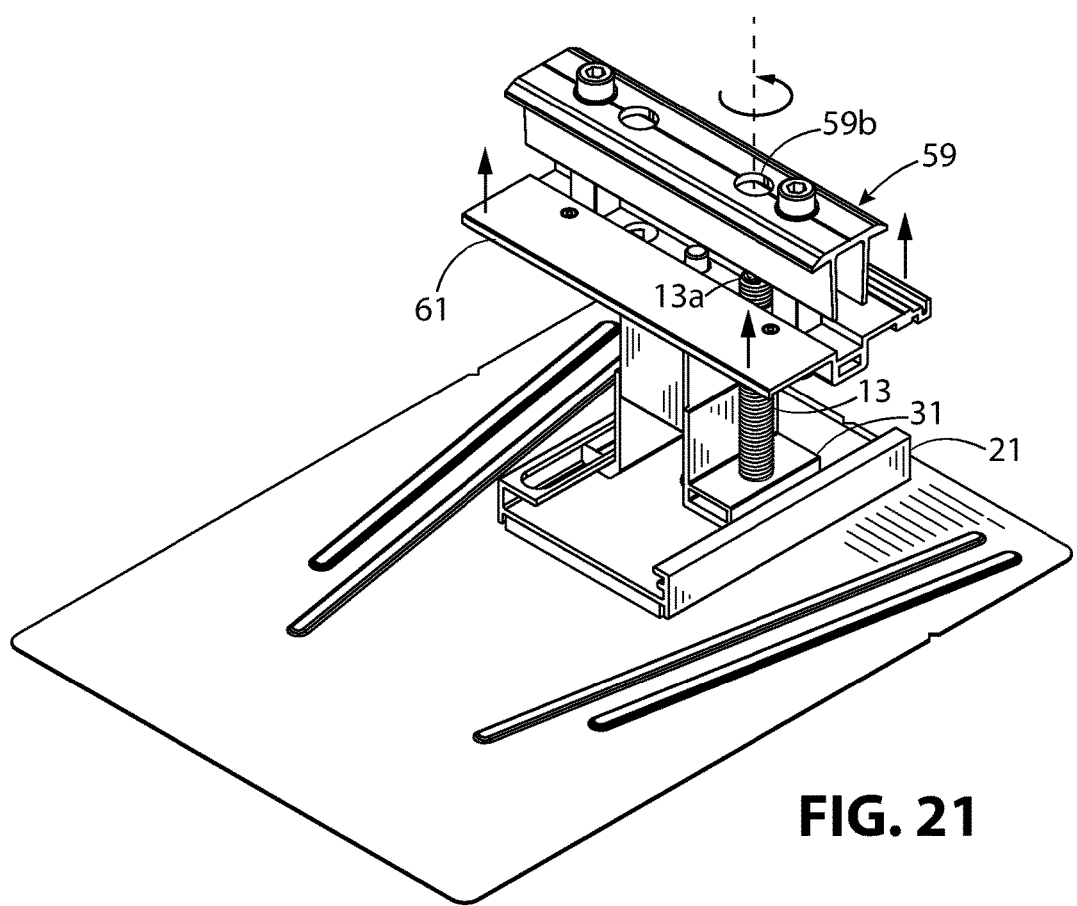
FIG. 21 illustrates the solar panel mounting assembly of FIG. 20 in rear, left, and top perspective view with the platform that supports the solar panels in a second position.
Figure 23:
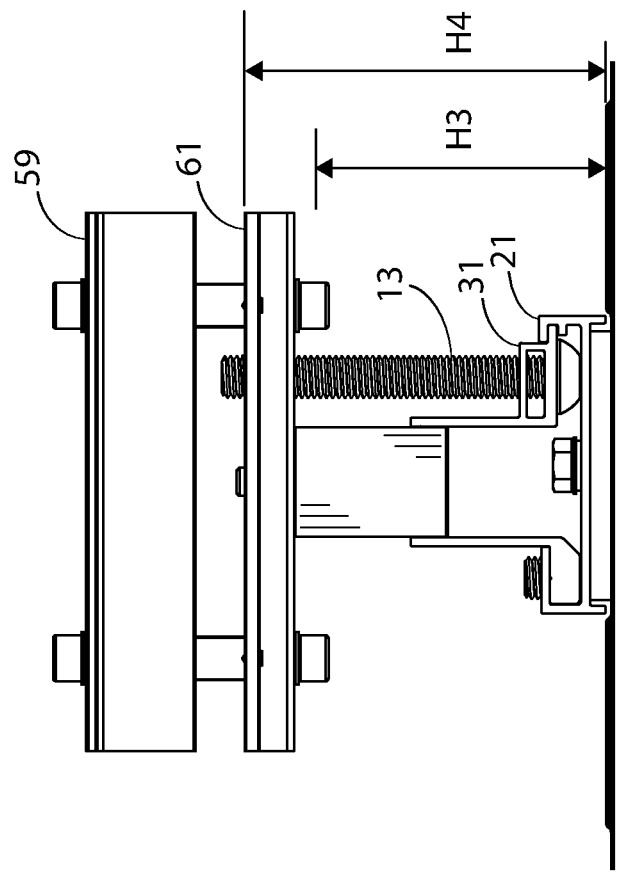
FIG. 23 illustrates the solar panel mounting assembly of FIG. 20 in rear view, with the platform that supports the solar panels positioned at a height H4 above the roof-mounting surface.
Figure 22:
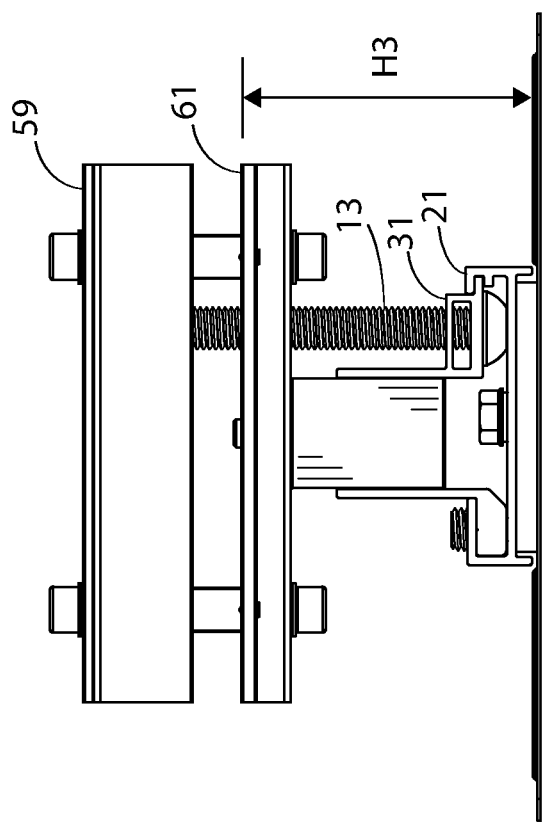
FIG. 22 illustrates the solar panel mounting assembly of FIG. 20 in rear view, with the platform that supports the solar panels positioned at a height H3 above the roof-mounting surface.

Referring to FIGS. 20-23, the height of the platform 61 can be adjusted using a similar mechanism as described for the solar panel mounting assembly 10 of FIGS. 1 and 2. For example, the height can be adjusted from height H3 in FIG. 22 to height H4 in FIG. 23. Height H3 is also illustrated in FIG. 23 for comparison. The principle of operation and the structural cooperation of the height adjuster 13 with the platform 61, base 21, and slider 31 is the same as described for these components in FIG. 9. The principal difference between the height-adjustment mechanism of FIG. 9 and of FIGS. 20-23 is that the height adjuster 13 of FIGS. 20-23 is positioned under the solar panel clamp 59 while the height adjuster 13 of FIG. 9 is positioned to one side of the solar panel clamp 17. In FIGS. 20 and 21 the height adjuster 13 is positioned directly under the second aperture 59b of the solar panel clamp 59. The second aperture 59b is sized to allow a tool to engage the drive pattern 13a (FIG. 21) of height adjuster 13. For example, if the drive pattern 13a is a hex socket, then the second aperture 59b would be larger than the size of the hex socket in order to allow the hex driver or Allen wrench to engage the hex socket. If the drive pattern 13a was a hex head or square head, then the second aperture 59b would have to be large enough to accommodate a hex or square socket.

Figure 24:
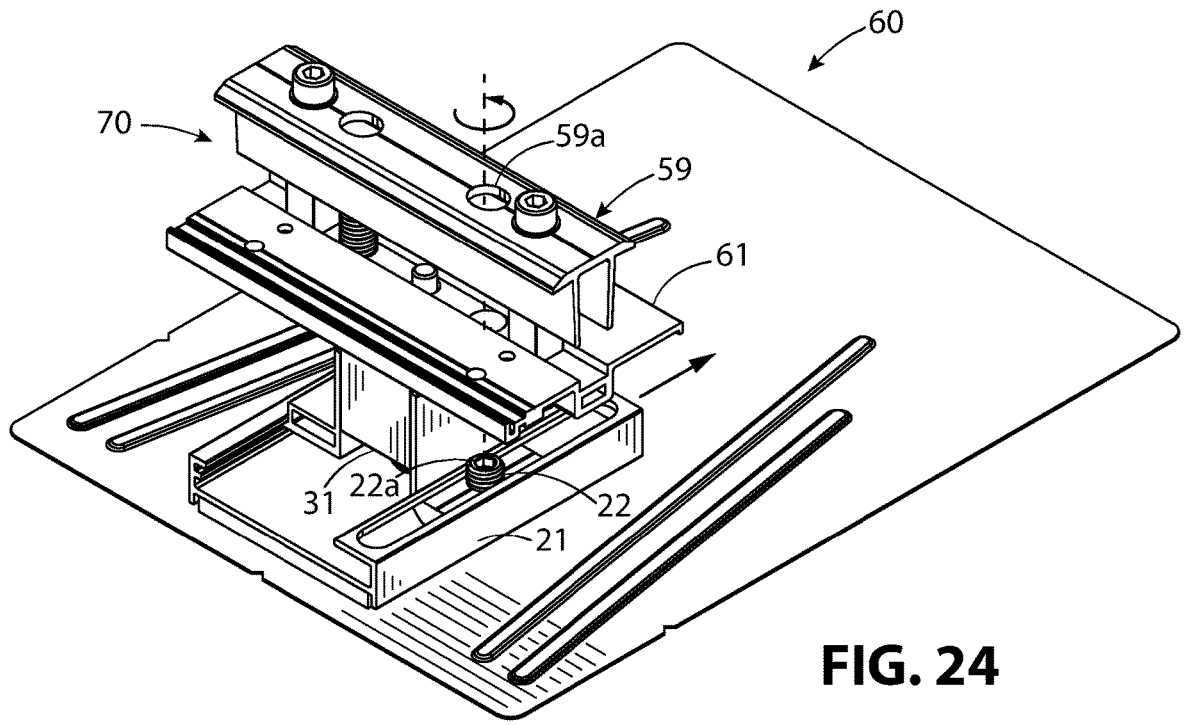
FIG. 24 illustrates the solar panel mounting assembly of FIG. 20 in front, right, and top perspective view with the upper assembly positioned approximately midway along the base.
Figure 25:
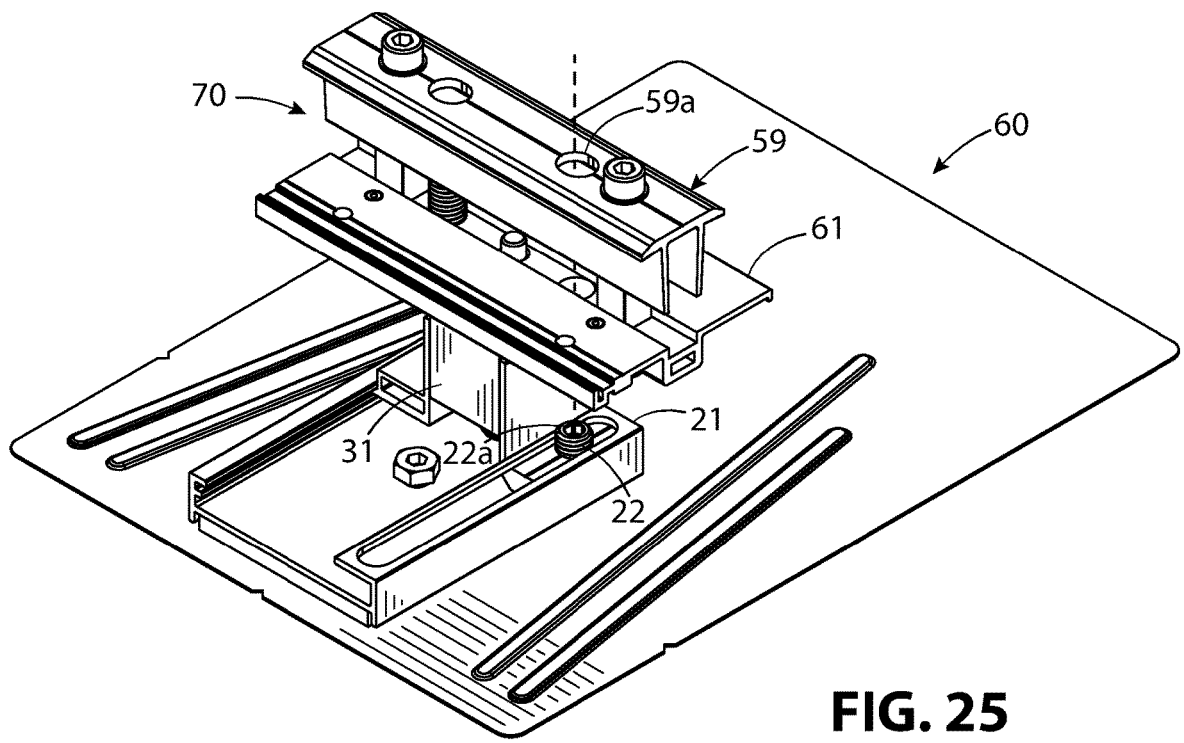
FIG. 25 illustrates the solar panel mounting assembly of FIG. 20 in front, right, and top perspective view with the upper assembly positioned nearly fully rearward along the base.

Referring to FIGS. 24 and 25, the position of the upper assembly 70 relative to the base 21 can be adjusted using a similar mechanism as described for the solar panel mounting assembly 10 of FIGS. 6 and 7. The principle of operation and the structural cooperation of the threaded locking fastener 22 with the platform 61, base 21, and slider 31 in FIGS. 24 and 25 is the same as described for the corresponding components in FIG. 10. The principal difference between the locking/sliding mechanisms of FIG. 10 and of FIG. 24 is that the threaded locking fastener 22 of FIG. 24 is positioned under the solar panel clamp 59 while the threaded locking fastener 22 of FIG. 10 is positioned to one side of the solar panel clamp 17. In FIGS. 24 and 25 the threaded locking fastener 22 is positioned directly under the first aperture 59a of the solar panel clamp 59. The first aperture 59a is sized to allow a tool to engage the drive pattern 22a of threaded locking fastener 22. For example, if the drive pattern 22a is a hex socket, then the first aperture 59a would be larger than the size of the hex socket in order to allow the hex driver or Allen wrench to engage the hex socket. If the drive pattern 22a was a hex head or square head, then the first aperture 59a would have to be large enough to accommodate a hex or square socket.

Figure 26:
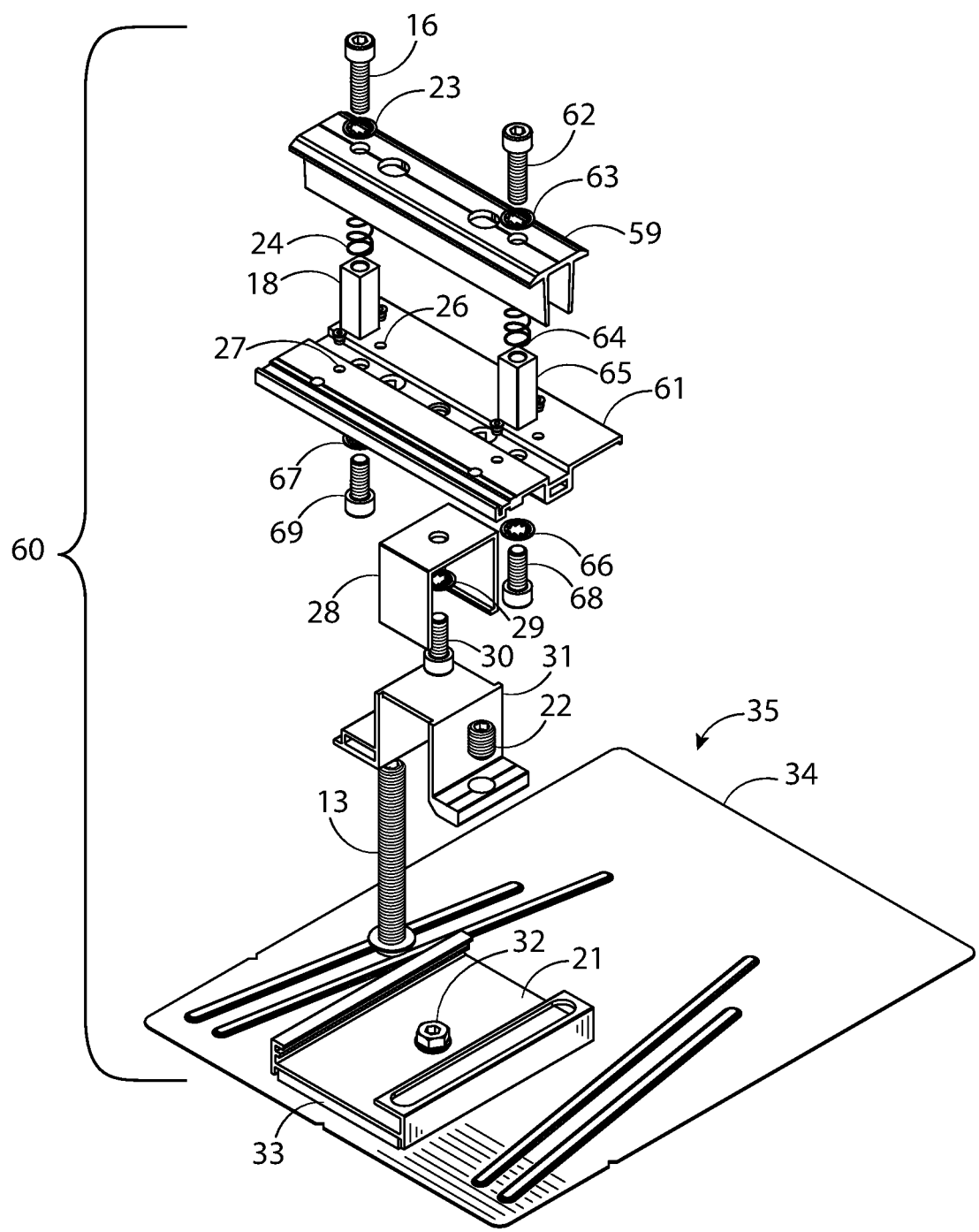
FIG. 26 illustrates a partially exploded, right, front, and top perspective view of the solar panel mounting assembly of FIG. 20.
Figure 27:
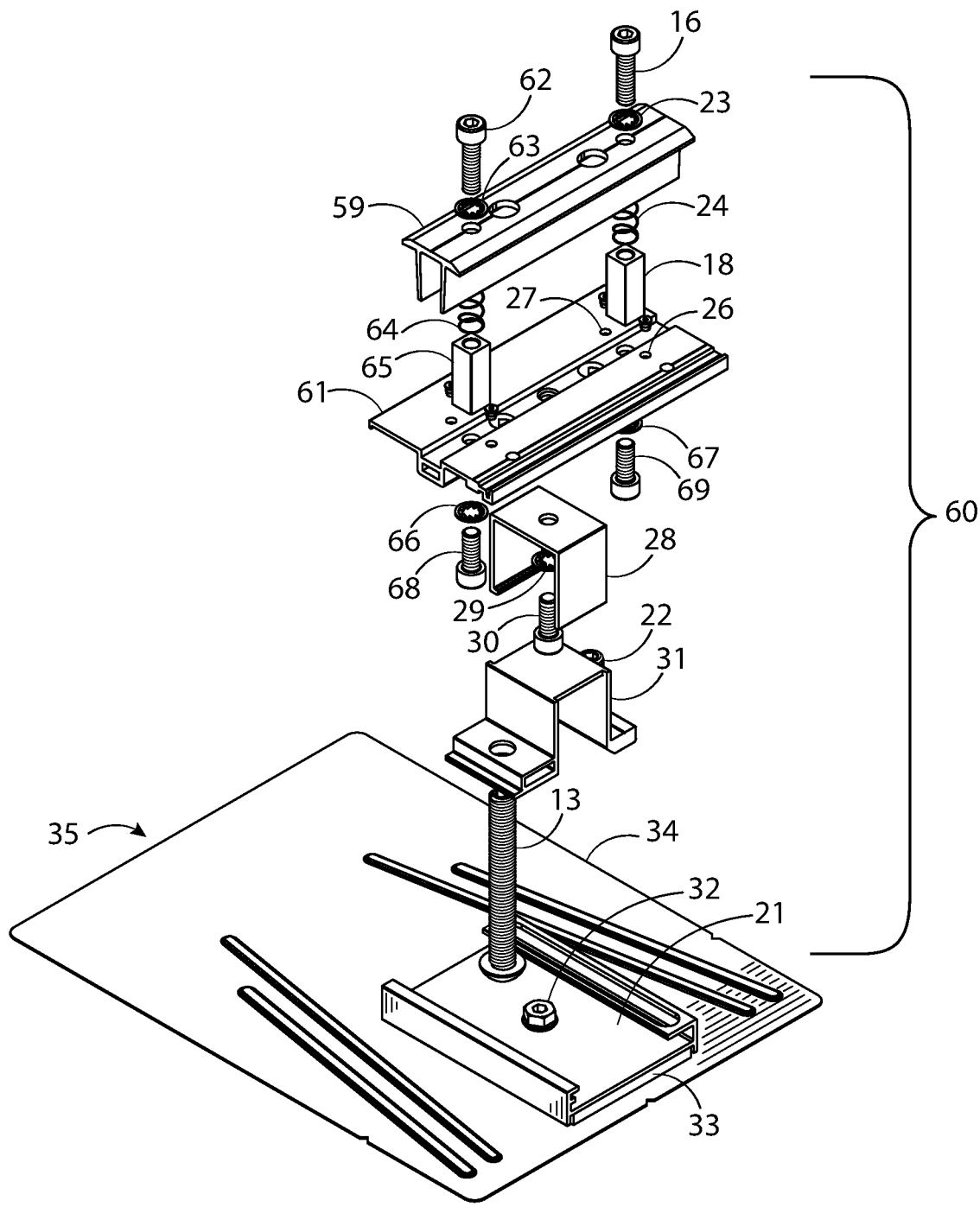
FIG. 27 illustrates an exploded, left, front, and top perspective view of the solar panel mounting assembly of FIG. 20.

Referring to FIGS. 26 and 27, the components and their interrelation of the solar panel mounting assembly 60 are illustrated in detail. In these figures, the reader can see that structure is similar. The differences in structure include the alignment of the height adjuster 13, the alignment of the threaded locking fasteners 22, and additional components to accommodate the platform 61 and solar panel clamp 59. Platform 61 and solar panel clamp 59 are both wider widthwise than platform 11 and solar panel clamp 17 of FIG. 10. Common components of FIGS. 26 and 27 with FIG. 10 include the threaded fastener 16, the washer 23, the spring 24, the pedestal 18, grounding pins 26, 27, the yoke 28, the washer 29, the threaded fastener 30, the slider 31, the threaded locking fastener 22, the height adjuster 13, the base 21, the roof fastener 32, the gasket 33, and the flashing 34. The base 21, roof fastener 32, the gasket 33, and the flashing 34 form the bottom assembly 35. The additional components to accommodate the platform 61 and solar panel clamp 59 include threaded fasteners 62, 68, 69, washers 63, 66, 67, spring 64, and pedestal 65.

Figure 29:
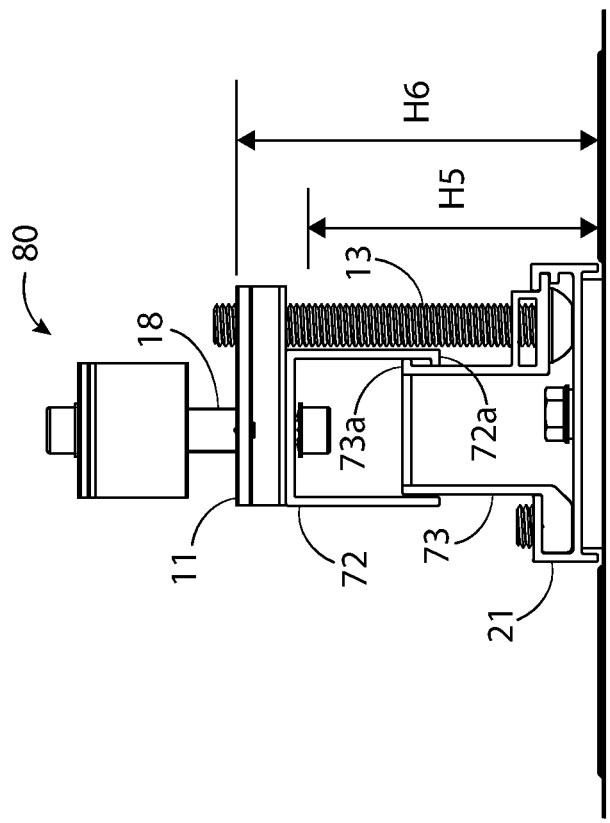
FIG. 29 illustrates the solar panel mounting assembly of FIG. 28 in rear view, with the platform that supports the solar panels positioned at a height H6 above the roof-mounting surface.
Figure 28:
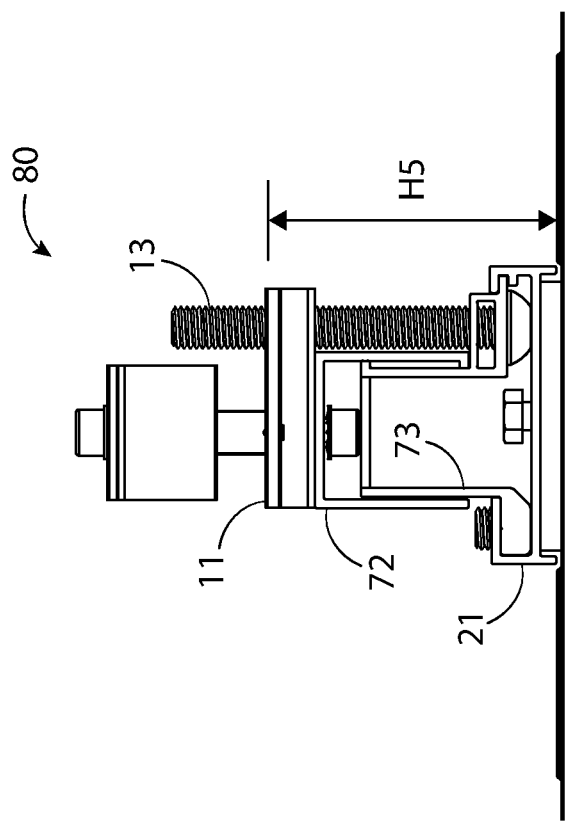
FIG. 28 illustrates a third example of a solar panel mounting assembly in rear view, with the platform that supports the solar panels positioned at a height H5 above the roof-mounting surface.
Figure 30:
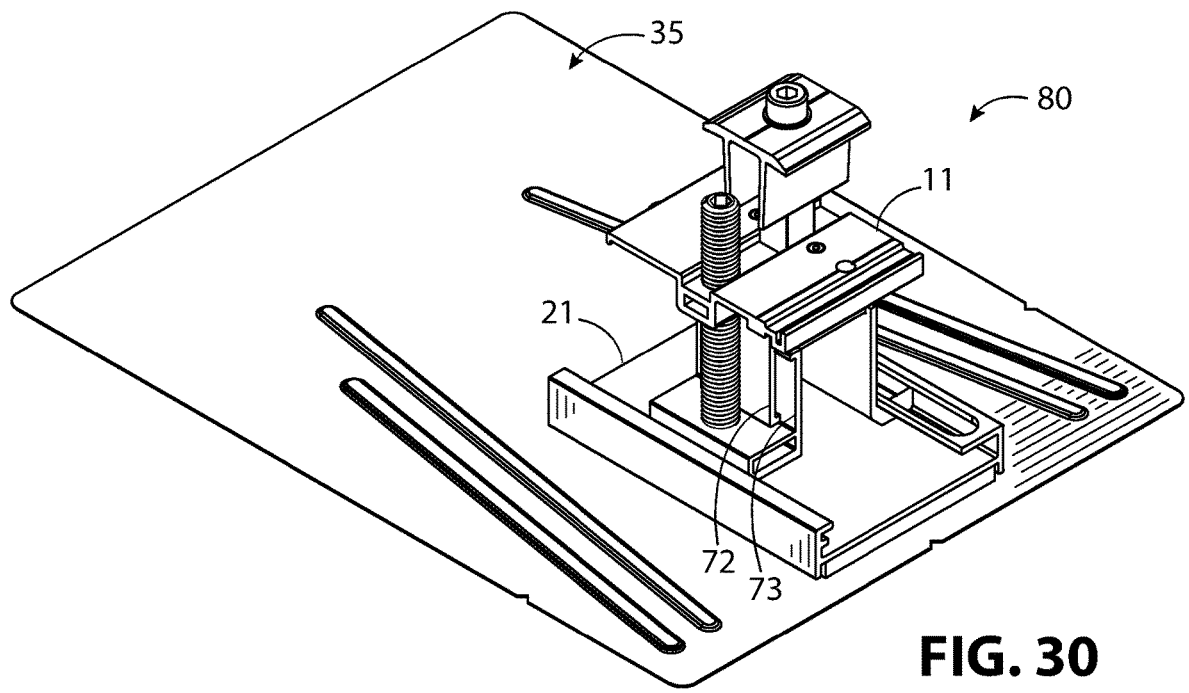
FIG. 30 illustrates the solar panel mounting assembly of the FIG. 28 in front, left, and top perspective view with the platform that supports the solar panels in approximately the midway.
Figure 31:
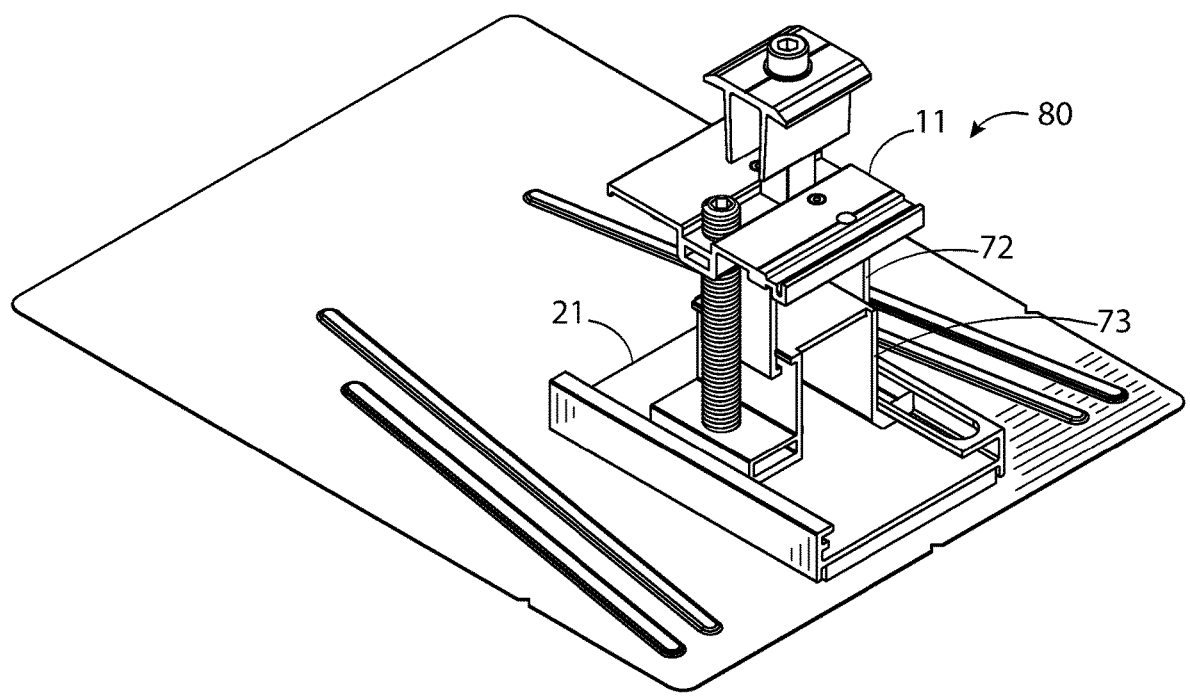
FIG. 31 illustrates the solar panel mounting assembly of FIG. 30 in rear, left, and top perspective view with the platform that supports the solar panels extended to nearly maximum height.
Figure 32:
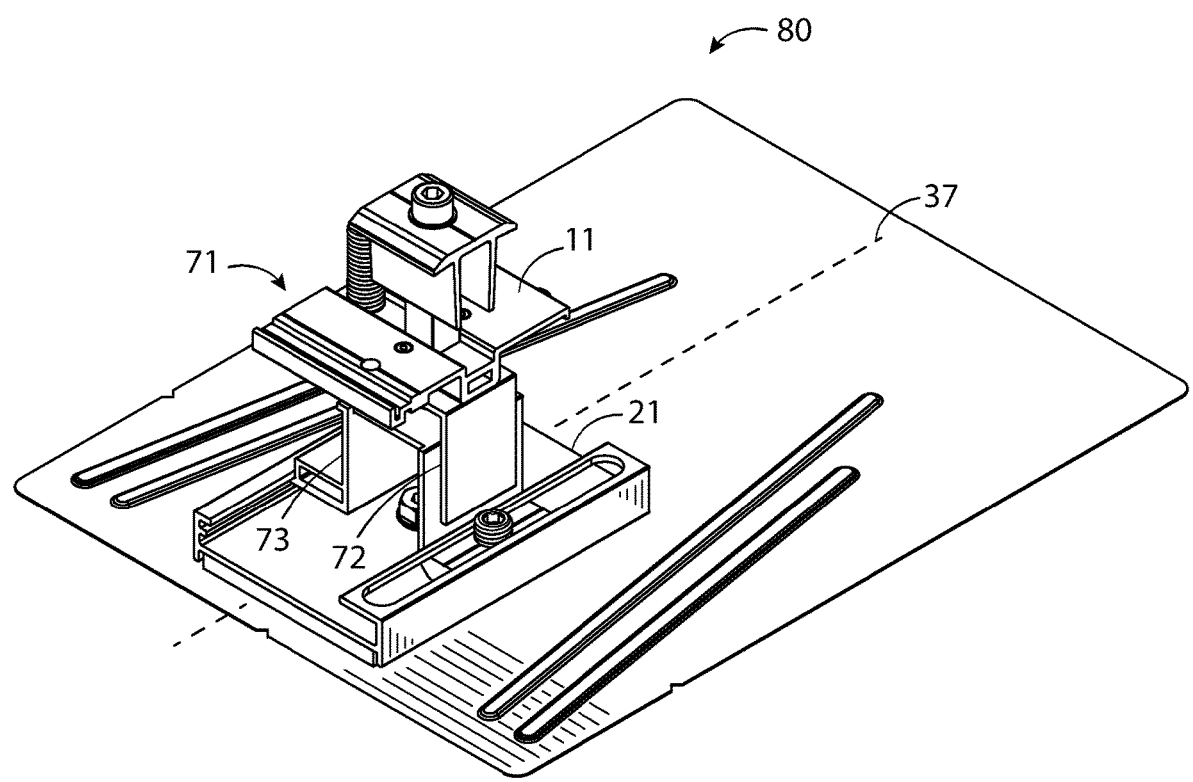
FIG. 32 illustrates the solar panel mounting assembly of FIG. 28 in front, right, and top perspective view with the upper assembly positioned approximately midway along the base.

FIGS. 28-32 illustrate a third example of the solar panel mounting assembly 80. As illustrated in FIGS. 28-32, the platform 11 is height adjustable relative to the base 21 in the same manner as previously described for FIGS. 1-4. Referring to FIGS. 28 and 29, as the height adjuster 13 is rotated, the platform 11 can move from height H5 to height H6 in the same manner as discussed from FIGS. 3 and 4. In FIGS. 30 and 31, the height is adjusted from approximately midway in FIG. 30 to nearly maximum height in FIG. 31. Referring to FIG. 32, the upper assembly 71 is adjustable along the lengthwise axis 37 of the base 21 in the same manner as previously described for FIGS. 6 and 7. Referring to FIGS. 28-32, the components can be the same as in the solar panel mounting assembly 10 of FIG. 1 except for the yoke 72 and the slider 73. The yoke 72 is rotated 90° with respect the slider 73 as compared with the yoke 28 and the slider 31 of FIG. 1. Referring to FIG. 29, the slider 73 and the yoke 72 essentially the same as the slider 31 and the yoke 28 of FIG. 1 except the slider 73 includes tab 73a that engages a lip 72a projecting inward from the yoke 72 as the yoke 72 is moved upward by the height adjuster 13. The tab 73a projects directly away from the slider side along the slider top surface. The lip 72a projects inwardly away from the bracket end. The yoke 72 is held in one-degree of freedom with respect to the slider 73, i.e., it is restricted to moving up and down along the slider 31 but cannot rotate. By holding the yoke 28 in one-degree of freedom in this way, it prevents the platform 11 and attached solar panels (not shown) from rotating as the yoke 28 moves up and down.

Solar panel mounting assemblies 10, 60, 80 have been described. It is not the intent of this disclosure to limit the claimed invention to the examples, variations, and exemplary embodiments described in the Specification. Those skilled in the art will recognize that variations will occur when embodying the claimed invention in specific implementations and environments. For example, all of the fasteners are shown with their drive pattern as a hex socket. While using the same type or same type and size of drive patterns is potentially helpful to the installer, other drive patterns, or a variety of different drive patterns may be used. For example, the drive patterns can be a slot, Phillips, Frearson, Robertson, cross, double hex, clutch, torx or other drive patterns capable of performing the functions described in a typical solar panel installation environment. In addition, instead of being inset, the drive pattern may be shaped into the perimeter of the fastener body end; for example, a hexagonal perimeter in order to receive a six-point socket.

Certain components, such as pedestal 18 and yoke 28 of FIG. 9 and pedestals 18, 65 and yoke 28 of FIG. 26 are attached to platforms 11, 61, respectively, by threaded fasteners and washers. Similarly, pedestal 18 and yoke 72 of FIG. 30 are attached to platform 11 by threaded fasteners and washers. Alternatively, the pedestals and yokes can be attached to the platforms by welding, adhesive, or otherwise forms of rigid fastening to form a rigid bond capable of withstanding the normal forces encountered by roof-mounted solar panel systems. The yoke 28 of FIGS. 9 and 26 can optionally be extruded with platforms 11, 61, respectively.

It is possible to implement certain features described in separate embodiments in combination within a single embodiment. Similarly, it is possible to implement certain features described in single embodiments either separately or in combination in multiple embodiments. For example, while the solar panel mounting assemblies 60, 80 are illustrated with the bottom assembly 35, see FIGS. 27, and 30 respectively. The reader, after reading the description for FIGS. 12-14 can readily implement the solar panel mounting assemblies 60, 80 with the bottom assembly 40 of FIG. 12.

Securing the solar panel mounting assemblies 10, 60, 80 directly to the roof, as illustrated in FIGS. 15 and 16, can be accomplished by using a gasket such as EPDM foam and removing the flashing from either of the bottom assemblies 35 or 40.

The threaded locking fastener 55 illustrated in FIG. 17 can readily be used in all embodiments. For example, the threaded locking fastener 55 of FIG. 17 can readily replace the threaded locking fastener 22 of the solar panel mounting assembly 60 shown in FIGS. 24, 25, 26, and 27. The threaded locking fastener 55 of FIG. 17 can readily replace the threaded locking fastener 22 of the solar panel mounting assembly 80 shown in FIG. 30.

The inventors envisions that all of the above described variations fall within the scope of the claimed invention.

"Optional" or "optionally" is used throughout this disclosure to describe features or structures that are optional. Not using the word optional or optionally to describe a feature or structure does not imply that the feature or structure is essential, necessary, or not optional. Using the word "or," as used in this disclosure is to be interpreted as the ordinary meaning of the word "or" (i.e., an inclusive or) unless modified by a word or phrase that would denote a choice of either one alternative or another. For example, the phrase "A or B" can mean: A alone, B alone, A in combination with B. The phrase "either A, or B" would mean A alone, B alone, but not A in combination with B.

While the examples, exemplary embodiments, and variations are helpful to those skilled in the art in understanding the claimed invention, it should be understood that, the scope of the claimed invention is defined solely by the following claims and their equivalents.

What is claimed is:

1. A device for mounting a solar panel to a roof surface, comprising:
    a base securable to the roof surface;
    a slider captively slidable along the base along a lengthwise axis thereof;
    a platform positioned above the slider, the platform including a centerline of which the solar panel can be mounted on either side of the centerline thereof;
    a height adjuster and a threaded locking fastener are positioned on opposite sides of the platform proximate to the centerline and are each upwardly oriented;
    the height adjuster by rotatably engaging the platform through the slider, causes the platform and the solar panel to move a distance relative to the slider, the base, and the roof surface; and
    the threaded locking fastener slidably engages the base into the slider and is impingeable against the base to control sliding of the slider relative to the base.

2. The device of claim 1, further including:
    a solar panel clamp that in cooperation with the platform can allow adjustment of the height adjuster and the threaded locking fastener from above when two of the solar panels are secured to the platform.

3. The device of claim 1, wherein:
    the height adjuster further comprises a height-adjuster head being captive between the base and the slider, a height-adjuster body extending from the height-adjuster head, and a drive pattern located at an end of the height-adjuster body that is distal to the height-adjuster head.

4. The device of claim 1, wherein:
    the slider further comprises a first flange and a second flange extending outward away from opposing sides of the slider and slidably engaging corresponding opposing lengthwise sides of the base.

5. The device of claim 1, wherein:
    the base further comprises a main body, a first flanged lip, and a second flanged lip extending inwardly over the main body from opposing lengthwise sides of the base;
    the slider further comprises a first flange and a second flange extending outwardly away from opposing sides of the slider; and
    the first flange and the second flange slidably engage the base between the main body and the first flanged lip and the second flanged lip, respectively.

6. The device of claim 5, wherein:
    the height adjuster further comprises a height-adjuster head, a height-adjuster body extending therefrom, and a drive pattern positioned at an end of the height-adjuster body that is distal to the height-adjuster head; and
    the height-adjuster body passing upwardly through the first flange and the height-adjuster head being captive between the first flange and the main body.

7. The device of claim 5, wherein:
    the second flanged lip further includes an enclosed slot that is position lengthwise therewith and the threaded locking fastener engages the main body through the enclosed slot and the second flange.

8. The device of claim 7, wherein:
    the height adjuster further comprises a height-adjuster head and a height-adjuster body extending therefrom; and
    the height-adjuster body passing upwardly through the first flange and the height-adjuster head being captive between the first flange and the main body.

9. A device for mounting a solar panel to a roof surface, comprising:
    a base securable to the roof surface;
    a slider captively slidable along the base along a lengthwise axis thereof;
    a platform disposed to mount the solar panel and positioned above the slider;
    a yoke positioned below the platform and secured therewith; and
    a height adjuster by rotatably engaging with the platform through the slider, causes the yoke to move along the slider a distance relative to the slider, the base, and the roof surface, the yoke being held in one-degree of freedom with the slider.

10. The device of claim 9, further including:
    a threaded locking fastener that is adjustable from above, the threaded locking fastener slidably engages the base into the slider and is impingeable against the base to control sliding of the slider relative to the base.

11. The device of claim 10, further including:
    a solar panel clamp that in cooperation with the platform can allow adjustment of the height adjuster and the threaded locking fastener from above when two of the solar panels are secured to the platform.

12. The device of claim 10, further including:
    the platform including a centerline of which the solar panel can be mounted on each side of the centerline thereof; and
    the height adjuster and the threaded locking fastener positioned on opposite sides of the platform, proximate to the centerline, and each are upwardly oriented.

13. The device of claim 9, wherein:
    the height adjuster further comprises a height-adjuster head being captive between the base and the slider, a height-adjuster body extending from the height-adjuster head, and a drive pattern located at an end of the height-adjuster body that is distal to the height-adjuster head.

14. The device of claim 9, wherein:

the slider further comprises a first flange and a second flange extending outward away from opposing sides of the slider and slidably engaging corresponding opposing lengthwise sides of the base.

15. The device of claim 9, wherein:

the base further comprises a main body, a first flanged lip, and a second flanged lip extending inwardly over the main body from opposing lengthwise sides of the base;

the slider further comprises a first flange and a second flange extending outwardly away from opposing sides of the slider; and the first flange and the second flange slidably engage the base between the main body and the first flanged lip and the second flanged lip, respectively.

16. The device of claim 15, wherein:

the height adjuster further comprises a height-adjuster head and a height-adjuster body extending therefrom; and the height-adjuster body passing upwardly through the first flange and the height-adjuster head being captive between the first flange and the main body.

17. The device of claim 15, wherein:

the second flanged lip further includes an enclosed slot that is oriented lengthwise therewith;

a threaded locking fastener that is adjustable from above, the threaded locking fastener slidably engages the main body through the second flange and is impingeable against the base to control sliding of the slider relative to the base.

18. The device of claim 17, wherein:

the height adjuster further comprises a height-adjuster head and a height-adjuster body extending therefrom; and the height-adjuster body passing upwardly through the first flange and the height-adjuster head being captive between the first flange and the main body.

\* \* \* \* \*